United States Patent

Kusama et al.

[11] Patent Number: 5,893,045
[45] Date of Patent: Apr. 6, 1999

[54] NAVIGATION APPARATUS WITH RELATIONSHIP BETWEEN GUIDE TARGET INTERSECTIONS

[75] Inventors: Toshiki Kusama; Yoshisada Mizutani, both of Tokyo, Japan

[73] Assignee: Mitsubishi Denki Kabushiki Kaisha, Tokyo, Japan

[21] Appl. No.: 759,222

[22] Filed: Dec. 5, 1996

[30] Foreign Application Priority Data

May 17, 1996 [JP] Japan ..................................... 8-123842

[51] Int. Cl.$^6$ ........................................................ G06G 7/78
[52] U.S. Cl. ........................ 701/211; 701/209; 701/208; 73/178 R
[58] Field of Search ..................................... 701/200, 207, 701/208, 209, 202, 210, 211, 25, 26; 340/988, 990, 995, 905; 73/178 R

[56] References Cited

U.S. PATENT DOCUMENTS

| | | | |
|---|---|---|---|
| 4,760,531 | 7/1988 | Yasui et al. ............................ | 701/200 |
| 4,763,270 | 8/1988 | Itoh et al. .............................. | 701/209 |
| 4,774,671 | 9/1988 | Itoh et al. .............................. | 701/208 |
| 4,782,447 | 11/1988 | Ueno et al. ............................ | 701/208 |
| 4,879,658 | 11/1989 | Takashima et al. ..................... | 701/209 |
| 4,882,696 | 11/1989 | Nimura et al. ......................... | 701/209 |
| 4,937,751 | 6/1990 | Nimura et al. ......................... | 701/211 |
| 5,121,326 | 6/1992 | Moroto et al. ......................... | 701/212 |
| 5,293,163 | 3/1994 | Kakihara et al. ....................... | 340/995 |
| 5,398,189 | 3/1995 | Inoue et al. ............................ | 340/990 |
| 5,410,486 | 4/1995 | Kishi et al. ............................ | 701/211 |
| 5,414,629 | 5/1995 | Inoue .................................... | 701/210 |
| 5,430,655 | 7/1995 | Adachi .................................. | 340/990 |
| 5,444,629 | 8/1995 | Kishi et al. ............................ | 701/211 |
| 5,452,212 | 9/1995 | Yokoyama et al. ..................... | 701/211 |
| 5,475,387 | 12/1995 | Matsumoto ............................ | 701/25 |
| 5,475,599 | 12/1995 | Yokoyama et al. ..................... | 701/211 |
| 5,774,071 | 6/1998 | Konishi et al. ......................... | 701/211 |

FOREIGN PATENT DOCUMENTS

3645100C2 10/1986 Germany .
6-34383 2/1994 Japan .

Primary Examiner—Jacques H. Louis-Jacques
Attorney, Agent, or Firm—Sughrue, Mion, Zinn, Macpeak & Seas, PLLC

[57] ABSTRACT

A navigation apparatus includes a guide unit (4) to extract a guide target intersection located on a path and to which a driver should be guided depending upon map data stored in a map information storage unit (1) and the path set by a path setting unit (2), and detect a distance between the two adjacent guide target intersections so as to concurrently provide guides about the two guide target intersections together with a relationship therebetween when the distance is within a specified value, or a guide unit (55) to extract an intersection between the extracted guide target intersection and a current position detected by a current position detecting unit (3) so as to display the intersection concurrently with the guide target intersection.

24 Claims, 37 Drawing Sheets

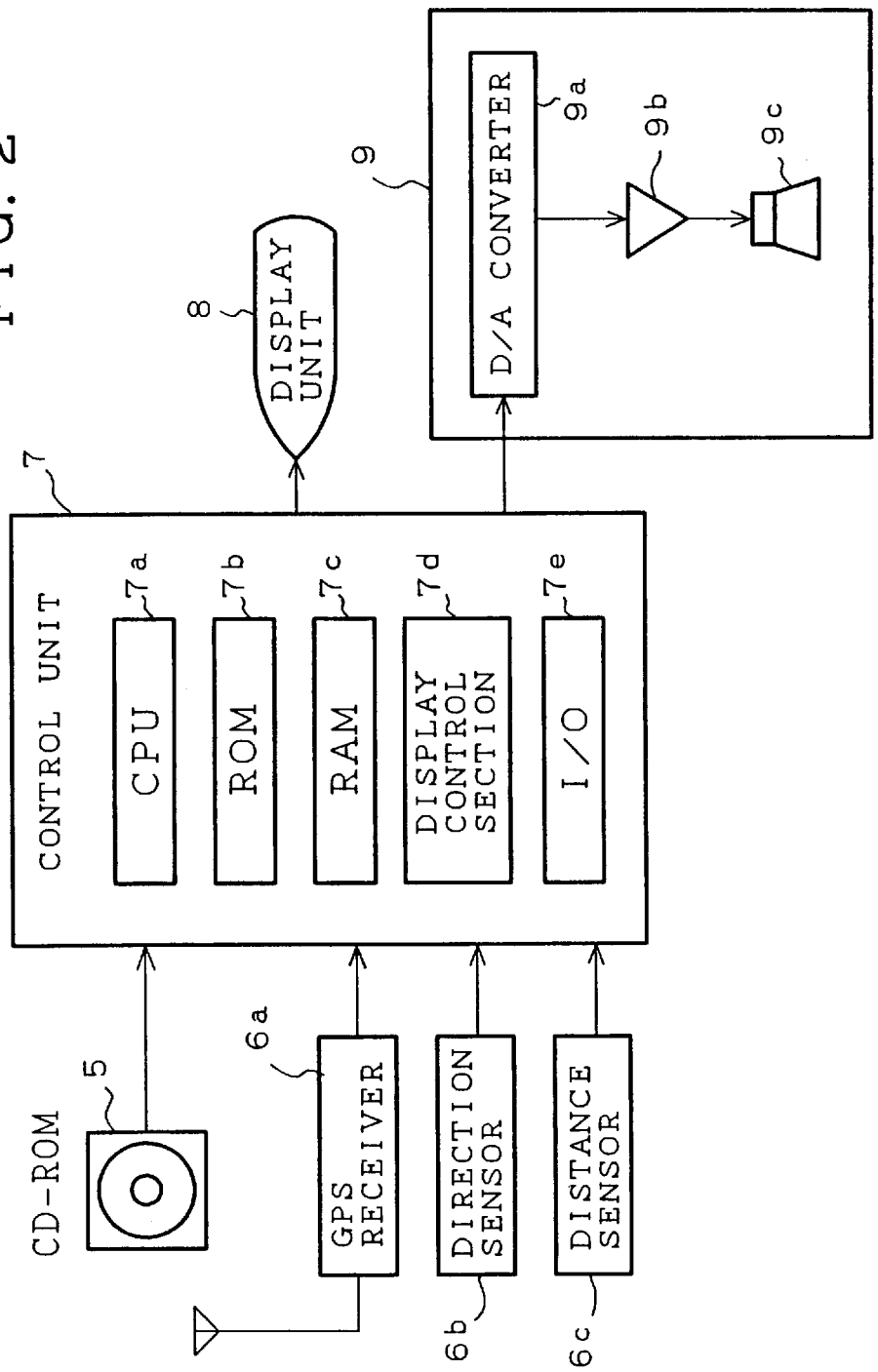

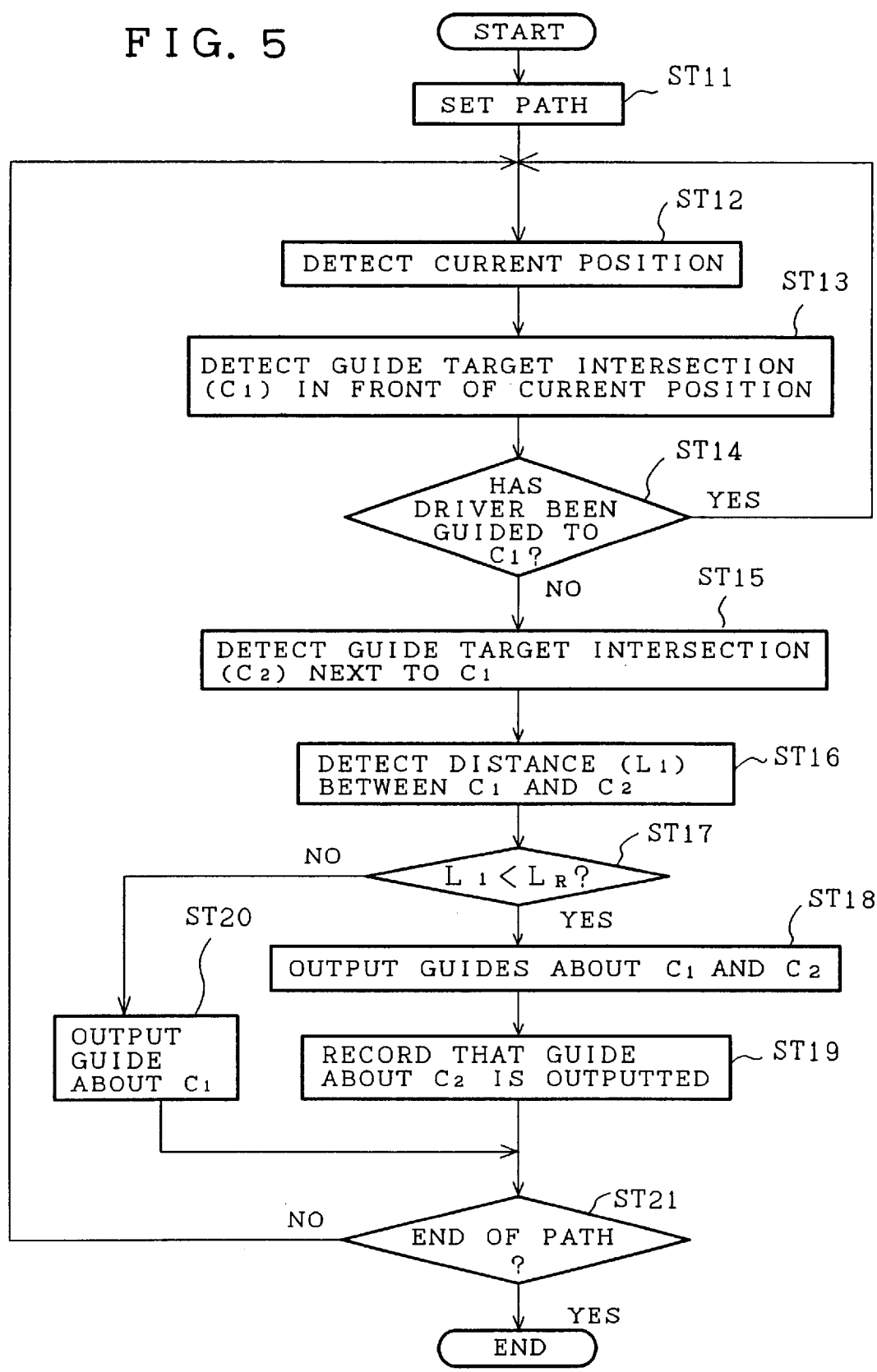

| GUIDE CONDITION | THE CONTENTS OF VOICE MESSAGE |
|---|---|
| GUIDE VOICE ABOUT ONLY $C_1$ | "TURN TO THE RIGHT PRESENTLY." |
| GUIDE VOICE ABOUT $C_1$, $C_2$ | "TURN TO THE RIGHT PRESENTLY. TURN TO THE LEFT BEYOND THE TURN." |

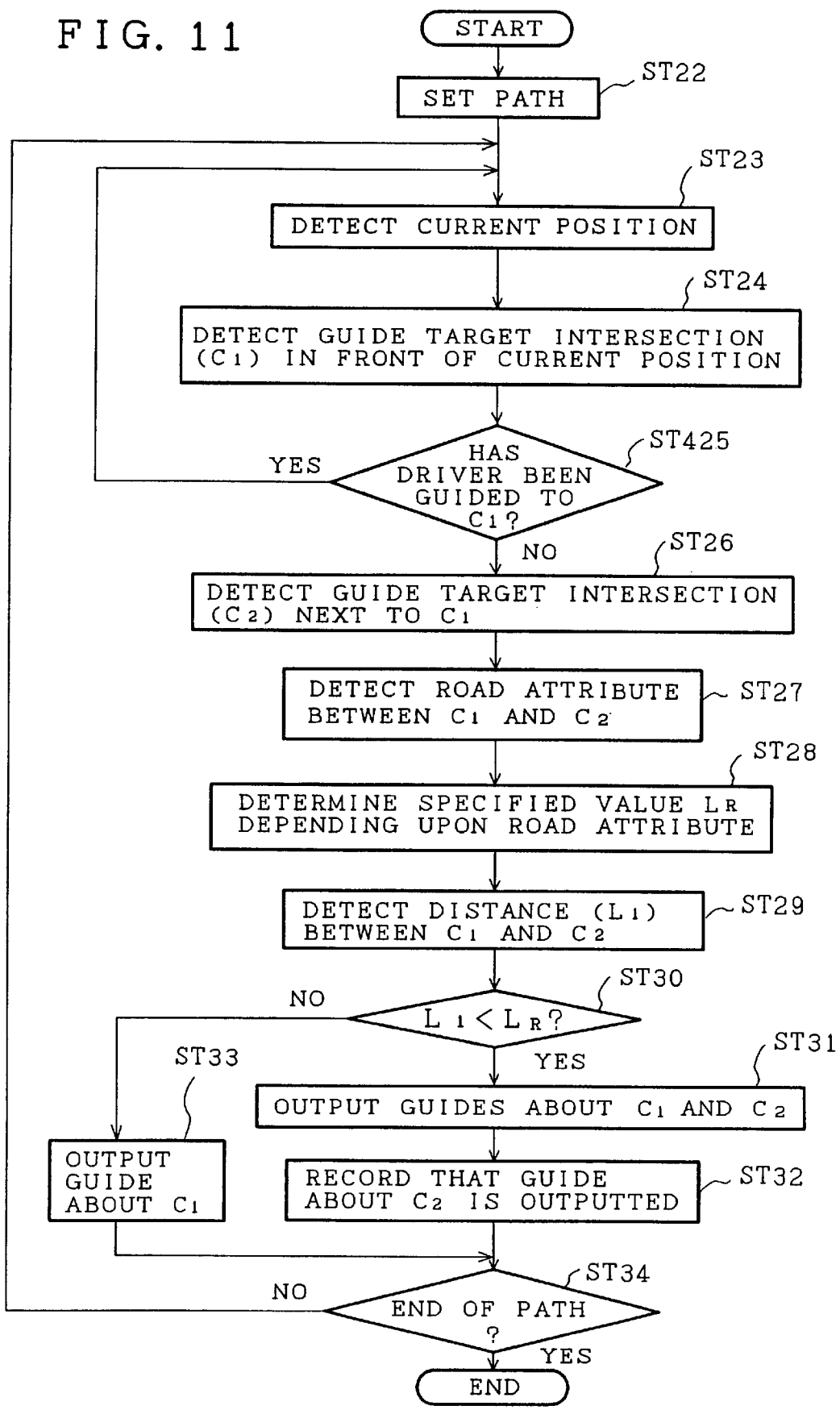

| DISTANCE RANGE | THE CONTENTS OF VOICE MESSAGE |
|---|---|
| $L_1 < 100m$ | " TURN TO THE RIGHT PRESENTLY. TURN TO THE LEFT SHORTLY. " |
| $100m \leq L_1 < 200m$ | " TURN TO THE RIGHT PRESENTLY. TURN TO THE LEFT BEYOND THE TURN. " |
| $200m \leq L_1 < L_R$ | " TURN TO THE RIGHT PRESENTLY. TURN TO THE LEFT LATER. " |

| ROAD ATTRIBUTE | THE CONTENTS OF VOICE MESSAGE |
|---|---|
| MAIN ROAD | " TURN TO THE RIGHT PRESENTLY. TURN TO THE LEFT BEYOND THE TURN. " |
| LAMP | " TURN TO THE RIGHT AFTER TAKING LEFT BY-PASS PRESENTLY. " |

| COMBINATION OF DIRECTIONS OF TRAVEL AT $C_1$ AND $C_2$ | THE CONTENTS OF VOICE MESSAGE |
|---|---|
| RIGHT, RIGHT (THE SAME DIRECTION) | "TURN TO THE RIGHT PRESENTLY. TURN TO THE RIGHT BEYOND THE TURN." |
| RIGHT, LEFT (OPPOSITE DIRECTIONS) | "TURN TO THE RIGHT PRESENTLY. TURN TO THE LEFT BEYOND THE TURN." |

FIG. 44

| 77 PRECE-DENCE | 78 INTERSECTION SHAPE |
|---|---|
| 1 | INTERSECTION CONNECTED TO NATIONAL ROAD, WITH SIGNAL AND INTERSECTION NAME |
| 2 | INTERSECTION CONNECTED TO PREFECTURAL ROAD, WITH SIGNAL AND INTERSECTION NAME |
| 3 | INTERSECTION CONNECTED TO ROAD HAVING ROAD WIDTH OF 5.5 m OR MORE, WITH SIGNAL AND INTERSECTION NAME |
| 4 | INTERSECTION CONNECTED TO NATIONAL ROAD, WITH SIGNAL |
| 5 | INTERSECTION CONNECTED TO PREFECTURAL ROAD, WITH SIGNAL |
| 6 | INTERSECTION CONNECTED TO ROAD HAVING ROAD WIDTH OF 5.5 m OR MORE, WITH SIGNAL |
| 7 | INTERSECTION EXCEPT CONFLUENCE AND JUNCTION |
| 8 | JUNCTION |
| 9 | CONFLUENCE |

FIG. 45

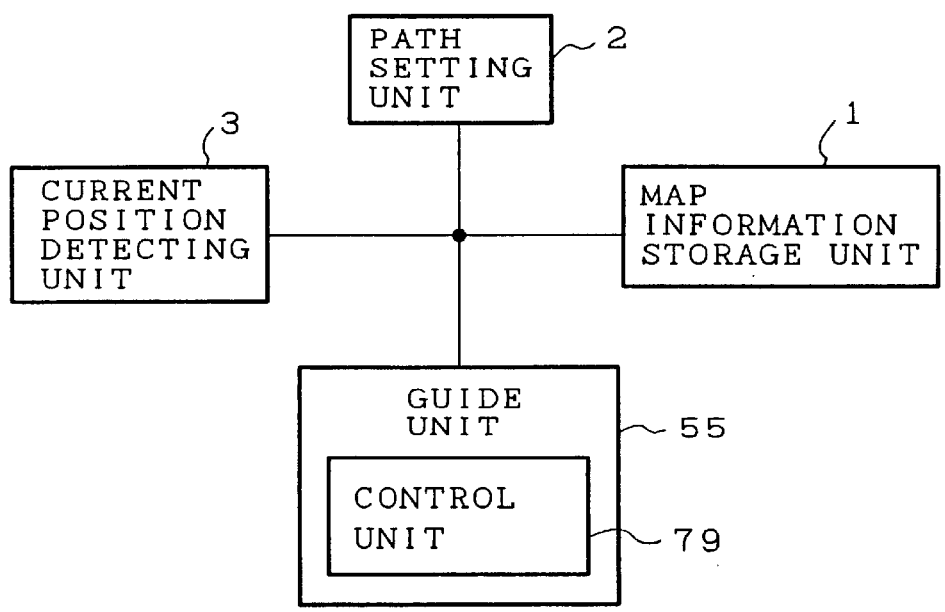

| THE NUMBER OF INTER-SECTIONS | OBJECT TO BE DISPLAYED |
|---|---|
| 1 | ROAD, INTERSECTION, INTERSECTION NAME, FACILITIES MARK, ROUTE NUMBER |
| 2 | ROAD, INTERSECTION, INTERSECTION NAME, FACILITIES MARK |
| 3 | ROAD, INTERSECTION, INTERSECTION NAME |
| 4 OR MORE | ROAD, INTERSECTION |

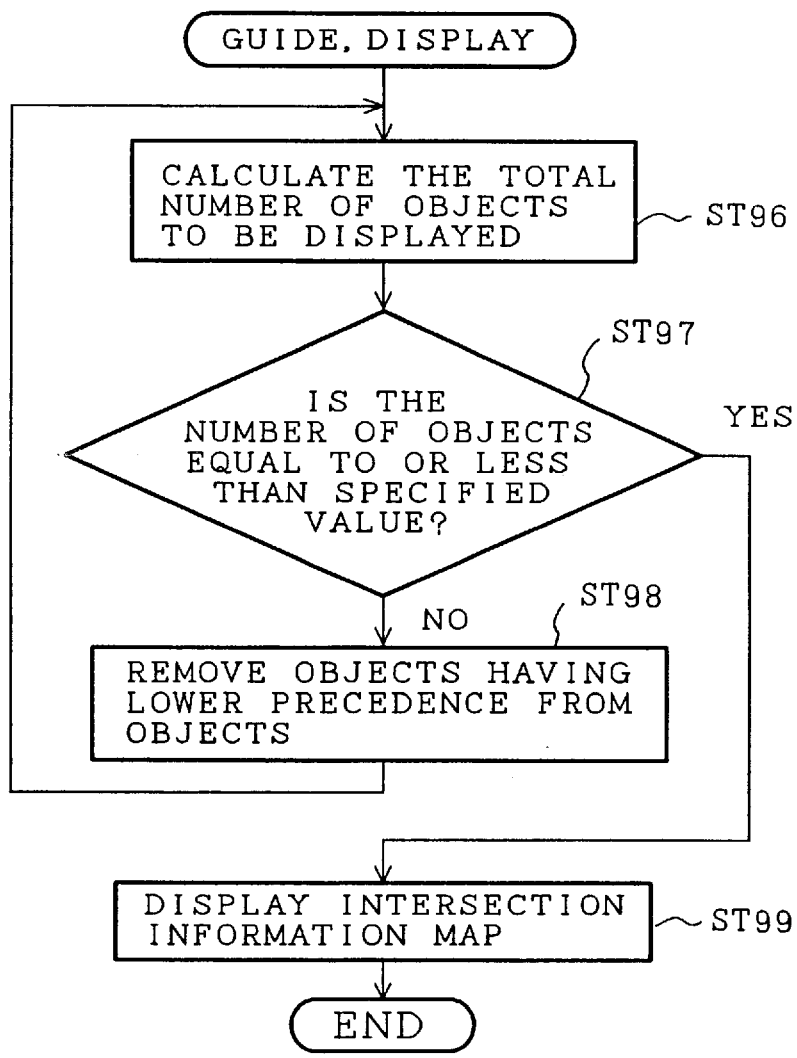

NAVIGATION APPARATUS WITH RELATIONSHIP BETWEEN GUIDE TARGET INTERSECTIONS

BACKGROUND OF THE INVENTION

1. Field of the Invention

The present invention relates to a navigation apparatus mounted on a mobile unit such as vehicle for a guide to a movement path, and so forth.

2. Description of the Prior Art

In order to inform a driver of guide information about an intersection on a set travel path, a conventional navigation apparatus outputs guides about a shape of the intersection serving as a guide target and a direction of travel from the guide target intersection through voice.

FIG. 62 is a flowchart showing a flow of processing in such a conventional navigation apparatus disclosed in, for example, JP-A 6/34383. The reference numerals are used for only essential steps in the drawing, and a description will now be given of the operation. In the navigation apparatus, as a first step, a current position pt of a mobile unit is calculated in step ST1. Further, a distance between the front specified point Xi (in front of the mobile unit) and the next specified point Xi+1 is calculated in step ST2. Subsequently, in step ST3, it is decided whether or not the distance between the two points is within a predetermined value. If within the predetermined value, the operation branches to step ST4 to output a guide voice message about the two points. On the other hand, if the distance is equal to or more than the predetermined value, the operation branches to step ST5 to output only a guide voice message about the specified point Xi.

The conventional navigation apparatus has the above structure. Hence, the contents of guide do not include a relationship between the guide target intersections, resulting in a problem of an obscure relationship between the guide target intersections. Besides, there are problems in that the contents of guide are outputted exclusively through the voice, and means for visually displaying the relationship and the contents of guide is not commercially available. In addition, there is another problem in that the guide target intersection can not easily be identified because of an obscure distance from the mobile unit to the guide target intersection.

SUMMARY OF THE INVENTION

In order to overcome the above problems, it is an object of the present invention to provide a navigation apparatus in which the contents of guide include a relationship between guide target intersections, and a guide about the guide target intersections with a distance between the guide target intersections within a specified value is provided concurrently with the relationship between the guide target intersections so as to provide a comprehensible relationship between the guide target intersections, and an intersection other than the guide target intersection is displayed concurrently with the guide target intersection so as to readably display the guide target intersection.

According to the present invention, for achieving the above-mentioned objects, there is provided a navigation apparatus including a map information storage unit in which digitized map data such as road data and intersection data is stored, a path setting unit to set a path between two points on the map data stored in the map information storage unit, a current position detecting unit to detect a current position of a mobile unit on the map data stored in the map information storage unit, and a guide unit to extract two adjacent guide target intersections about which a user should be informed of guide information from among intersections on the path depending upon the map data stored in the map information storage unit and the path set in the path setting unit, and detect a distance between the two guide target intersections so as to inform of the guide information about the two guide target intersections when the distance is within a specified value.

Preferably, in the guide unit, the guide information about the two guide target intersections may be displayed on a display unit. Alternatively, the guide unit may inform a driver of the guide information about the two guide target intersections as a voice message through voice. Alternatively, the guide unit may inform the driver of the guide information about the two guide target intersections as the voice message through voice concurrently with display of the guide information on the display unit.

According to one preferred embodiment of the present invention, a guide unit detects a road attribute between two extracted adjacent guide target intersections, and determines a specified value depending upon the road attribute.

According to another preferred embodiment of the present invention, a guide unit selects, depending upon a distance between two extracted adjacent guide target intersections, a voice message including a word showing the distance, and informs of the voice message through voice.

According to a further preferred embodiment of the present invention, a guide unit detects a road attribute between two extracted adjacent guide target intersections, and selects a voice message including a word showing the road attribute so as to inform of the voice message through voice.

According to a still further preferred embodiment of the present invention, a guide unit detects directions of travel of a mobile unit at two extracted adjacent guide target intersections, and selects a voice message used to inform depending upon a combination of the directions of travel so as to inform of the voice message through voice.

According to a still further preferred embodiment of the present invention, a guide unit has a control unit to, after guides about two extracted adjacent guide target intersections are provided, decide whether or not a distance between the guide target intersections is within a second specified value, and if the distance is equal to or more than the second specified value, inform of a voice message about the guide target intersection on the destination side once again after a mobile unit passes by the guide target intersection on the start point side.

According to a still further preferred embodiment of the present invention, a guide unit has a control unit to, after guides about two extracted adjacent guide target intersections are provided, decide whether or not a predetermined time is elapsed before a guide target intersection on the start point side is passed by, and if the predetermined time is elapsed, inform of a voice message about a guide target intersection on the destination side once again after a mobile unit passes by the guide target intersection on the start point side.

According to a still further preferred embodiment of the present invention, there is provided a navigation apparatus including a map information storage unit in which digitized map data such as road data and intersection data is stored, a path setting unit to set a path between two points on the map data stored in the map information storage unit, a current position detecting unit to detect a current position of a mobile unit on the map data stored in the map information storage unit, and a guide unit to extract a guide target intersection to be displayed on a display unit from among intersections on the path depending upon the map data stored in the map information storage unit and the path set in the path setting unit, detect an intersection except the guide target intersection located on the path between the guide target intersection and the current position of the mobile unit detected by the current position detecting unit depending upon the extracted guide target intersection, the map data stored in the map information storage unit, and the path set in the path setting unit, and display the intersection together with the guide target intersection on the display unit as an intersection information map.

According to a still further preferred embodiment of the present invention, a guide unit detects only an intersection located at a distance within a specified value from a guide target intersection from among intersections except the guide target intersection located on a path between the guide target intersection and a current position of a mobile unit.

According to a still further preferred embodiment of the present invention, a guide unit detects an intersection of which a driver can be conscious, located on a path between a guide target intersection and a current position of a mobile unit.

According to a still further preferred embodiment of the present invention, a guide unit detects a distinctive intersection located on a path between a guide target intersection and a current position of a mobile unit. Preferably, at a time of detecting the distinctive intersection located on the path between the guide target intersection and the current position of the mobile unit, the guide unit limits the number of detected distinctive intersections within a specified value.

According to a still further preferred embodiment of the present invention, a guide unit has a control unit to select objects displayed on an intersection information map according to the number of intersections displayed on the intersection information map.

According to a still further preferred embodiment of the present invention, a guide unit has a control unit to limit the total number of objects displayed on an intersection information map within a specified value.

According to a still further preferred embodiment of the present invention, a guide unit puts a mark showing that it is a guide target intersection on the guide target intersection displayed on an intersection information map.

According to a still further preferred embodiment of the present invention, a guide unit has a control unit to adjust a display distance between intersections displayed on an intersection information map such that the entire intersection information map can be accommodated in a display screen.

The above and further objects and novel features of the invention will more fully appear from the following detailed description when the same is read in connection with the accompanying drawings.

BRIEF DESCRIPTION OF THE DRAWINGS

FIG. 2 is a block diagram showing a hardware configuration of the navigation apparatus according to the embodiment 1 of the present invention;

FIG. 5 is a flowchart showing a flow of processing in the embodiment 1 of the present invention;

FIG. 11 is a flowchart showing a flow of processing in the embodiment 2 of the present invention;

FIG. 44 is an explanatory view showing one illustrative table showing precedence of display of an intersection in the embodiment 13 of the present invention;

FIG. 45 is a block diagram showing a functional structure of a navigation apparatus according to the embodiment 14 of the present invention;

FIG. 52 is a flowchart showing an essential part of a flow of processing in the embodiment 15 of the present invention;

FIG. 53 is an explanatory view showing one illustrative table showing precedence of display of an object in the embodiment 15 of the present invention;

DETAILED DESCRIPTION OF THE PREFERRED EMBODIMENTS

Embodiment 1

A description will now be given of one preferred embodiment of the present invention.

Figure 1:
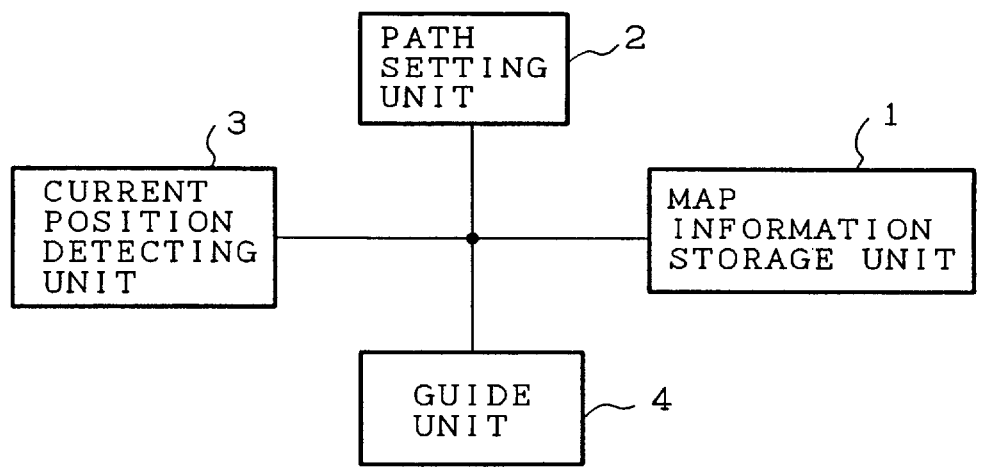
FIG. 1 is a block diagram showing a functional structure of a navigation apparatus according to the embodiment 1 of the present invention.

FIG. 1 is a block diagram showing a functional structure of a navigation apparatus according to the embodiment 1 of the present invention. In the drawing, reference numeral 1 means a map information storage unit in which digitized map data including at least road data and intersection data is stored, and 2 is a path setting unit to set a path between two specified points on the map data stored in the map information storage unit 1. Reference numeral 3 means a current position detecting unit to detect a current position of a mobile unit equipped with the navigation apparatus on the map data stored in the map information storage unit 1, and 4 is a guide unit. The guide unit 4 extracts the closest right-turning/left-turning guide target intersection serving as a guide target on the path and the next guide target intersection depending upon the map data stored in the map information storage unit 1 and the path set in the path setting unit 2 so as to detect a distance between the two adjacent guide target intersections. Further, it is decided whether or not the distance is within a predetermined specified value $L_R$. If within the specified value $L_R$, the guide unit 4 displays guide information about the two guide target intersections, and informs of a voice message corresponding to the guide information.

FIG. 2 is a block diagram showing a hardware configuration of the navigation apparatus having the functional structure. In the drawing, reference numeral 5 means a compact disc read-only memory (CD-ROM) containing map information, 6a is a global positioning system receiver (GPS receiver) to detect the current position of the mobile unit equipped with the navigation apparatus, 6b is a direction sensor to detect a direction of the mobile unit, and 6c is a distance sensor to detect a distance traveled by the mobile unit. Reference numeral 7 means a control unit to control various types of operations and the entire navigation apparatus, 8 is a display unit such as liquid crystal display to display display data sent from the control unit 7, and 9 is a voice output apparatus to output a voice message.

The control unit 7 includes a central processing unit (CPU) 7a, a read-only memory (ROM) 7b, a random access memory (RAM) 7c, a display control section 7d for display control of the display unit 8, and an input-output unit (I/O) 7e to do input and output between the control unit 7 and the outside. Further, the voice output apparatus 9 includes a digital-to-analog converter (D/A converter) 9a to convert a voice data signal recorded by a digital signal into an analog signal, an amplifier 9b to amplify a signal, and a speaker 7c to output the voice message.

The map information storage unit 1 shown in FIG. 1 corresponds to the CD-ROM 5 shown in FIG. 2, and the current position detecting unit 3 includes the GPS receiver 6a, the direction sensor 6b, and the distance sensor 6c. Further, the path setting unit 2 is implemented by the control unit 7, and the guide unit 4 is implemented by the display unit 8, the voice output apparatus 9, and the control unit 7.

Figure 3:
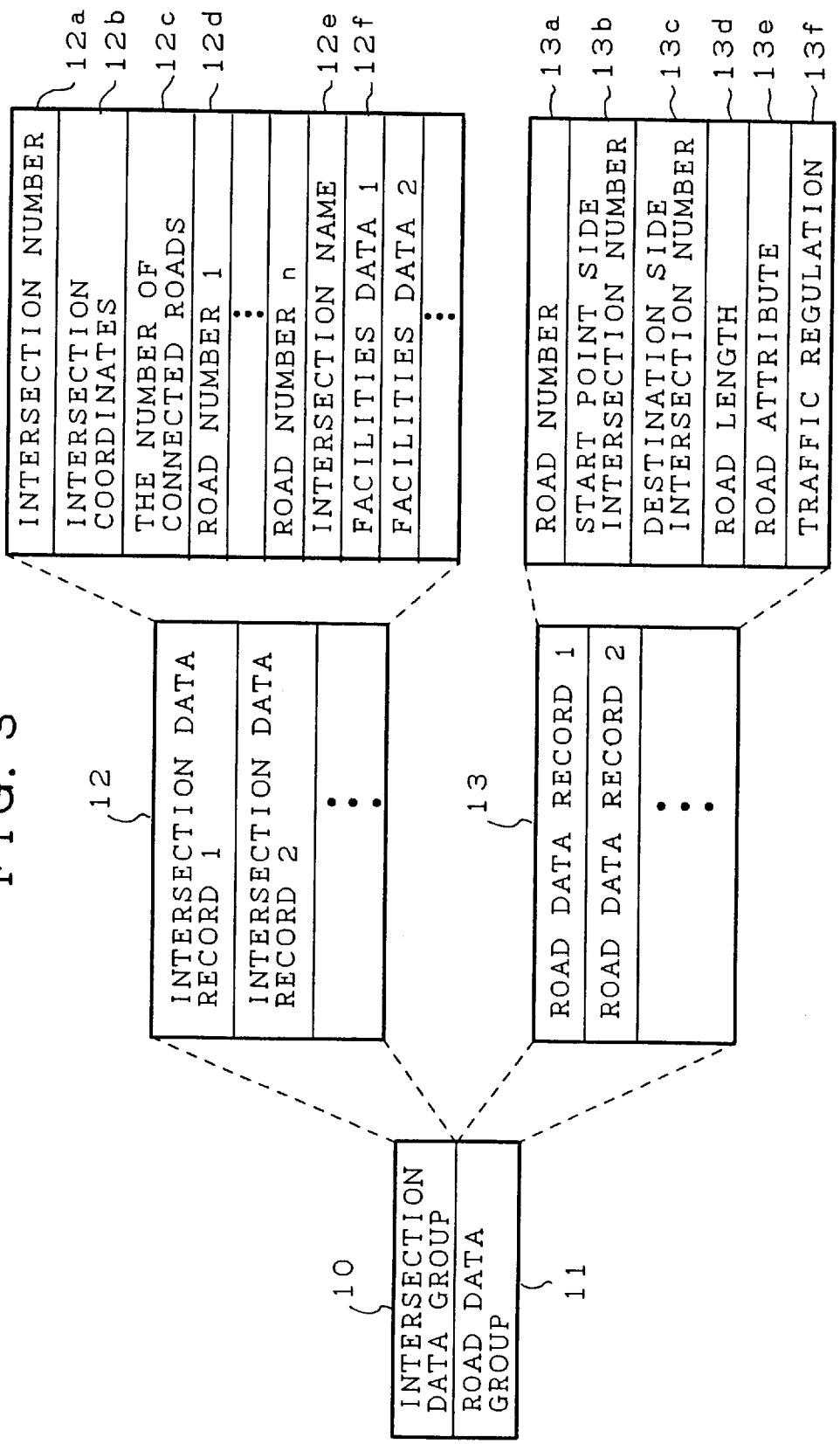
FIG. 3 is an explanatory view showing one illustrative data structure of map data in the embodiment 1 of the present invention.

FIG. 3 is an explanatory view showing a structure of the map data stored in the map information storage unit 1. In the drawing, reference numeral 10 means an intersection data group serving as one component part of the map data and a group of data about intersections, and 11 is a road data group serving as another component part and a group of data about roads. Reference numeral 12 means intersection data records in which data corresponding to the intersections are collected, and 13 is road data records in which data corresponding to the roads are collected.

Reference numeral 12a to 12f mean data respectively forming the intersection data records 12, 12a is an intersection number showing an ID number uniquely given to one intersection, 12b is intersection coordinates showing a position of the intersection on the map through, for example, latitude and longitude, 12c is the number of connected roads showing the number of roads connected to the intersection, 12d is a road number of a connected road, 12e is an intersection name showing a name of the intersection, and 12f is facilities data serving as a group of data about facilities which are present in the vicinity of the intersection. Further, reference numerals 13a to 13f mean data respectively forming the road data records 13, 13a is a road number showing an ID number uniquely given to one road, 13b is a start point side intersection number showing an intersection connected to the start point side of a road, 13c is a destination point side intersection number showing an intersection connected to the destination side of a road, 13d is a road length showing a length of a road, 13e is a road attribute showing an attribute of a road, and 13f is a traffic regulation showing traffic regulation information of a road.

Figure 4:
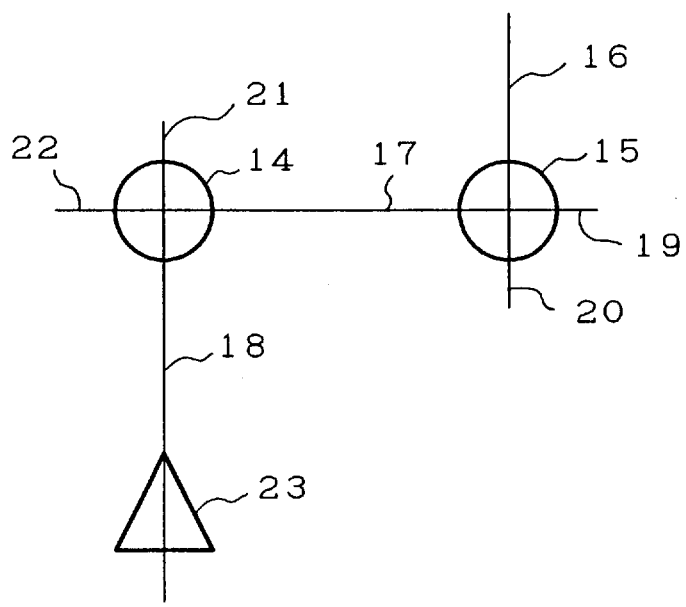
FIG. 4 is an explanatory view showing one illustrative actual path set in the embodiment 1 of the present invention.

FIG. 4 is an explanatory view showing one illustrative actual path set by the path setting unit 2. In the drawing, reference numerals 14 and 15 mean guide target intersections determined by the guide unit 4, and 16 to 18 are roads (hereinafter referred to as path road) on the set path. Reference numerals 19 to 22 mean roads other than the path roads 16 to 18, connected to the guide target intersection 14 or 15, and 23 is a current position showing a position of the mobile unit.

FIG. 5 is a flowchart showing a flow of processing in the navigation apparatus according to the embodiment 1. In the drawing, reference numerals ST11 to ST21 mean steps showing the units of processing.

Figure 6:
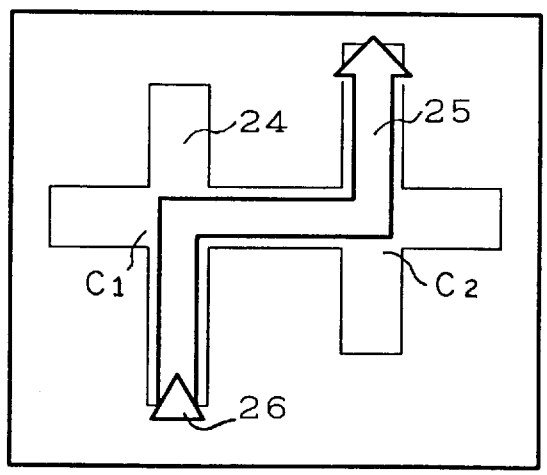
FIG. 6 is an explanatory view showing one illustrative intersection information map displayed in the embodiment 1 of the present invention.
Figure 7:
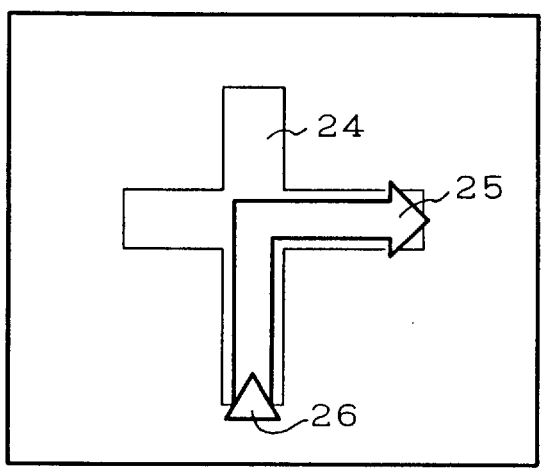
FIG. 7 is an explanatory view showing another illustrative intersection information map displayed in the embodiment 1 of the present invention.

FIGS. 6 and 7 are explanatory views showing illustrative intersection information maps displayed by the guide unit 4. In the drawings, reference numeral 24 means shapes of a guide target intersection and a road between the guide target intersections, 25 is a direction of travel from the guide target intersection, and 26 is the current position 23 of the mobile unit shown in FIG. 4.

Figures 8, 9:
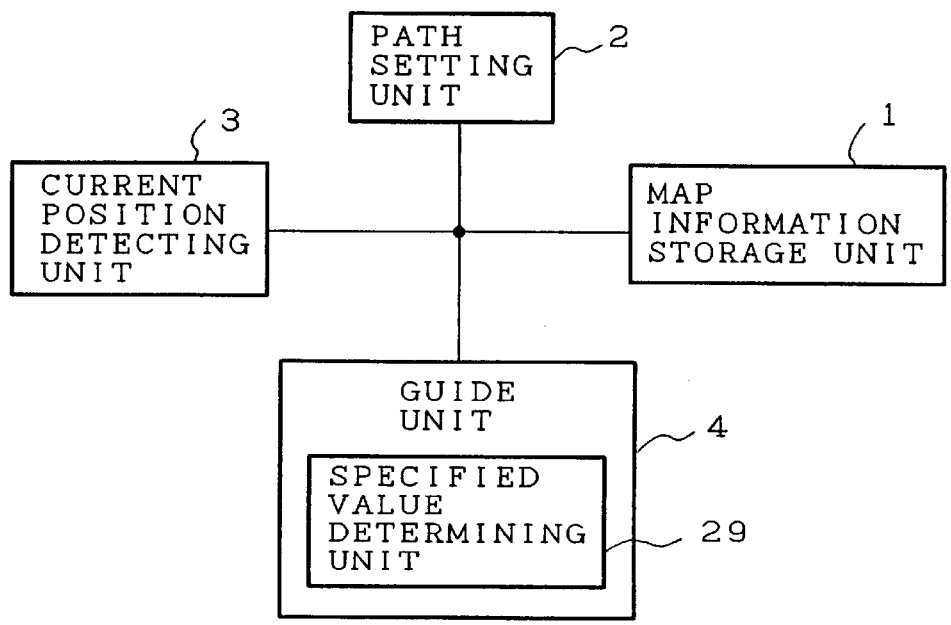
FIG. 8 is an explanatory view showing one illustrative voice message used to inform in the embodiment 1 of the present invention.
FIG. 9 is a block diagram showing a functional structure of a navigation apparatus according to the embodiment 2 of the present invention.

FIG. 8 is an explanatory view showing the illustrative contents of the voice message outputted from the guide unit 4 corresponding to a guide condition. In the drawing, reference numeral 27 means a guide condition used to select the contents of the voice message at a time of informing through voice, and 28 is the illustrative contents of the voice message.

A description will now be given of the operation. In step ST11, the path setting unit 2 sets two points such as start point, and destination on the map data through latitude and longitude, or the like, and sets a path between the two points on the map by using, for example, Dijkstra's algorithm serving as general search algorithm on a network. Subsequently, in step ST12, the current position detecting unit 3 detects a current position. Next, the operation proceeds to step ST13 where the guide unit 4 extracts intersections in front of the current position detected by the current position detecting unit 3 from among the intersections located on the set path and the two points set by the path setting unit 2, and extracts from among the intersections the closest right-turning/left-turning front guide target intersection $C_1$ (corresponding to the guide target intersection 14 shown in FIG. 4) serving as an intersection with three or more roads connected to the intersection. Subsequently, in step ST14, it is decided whether or not a driver has been guided to the extracted front guide target intersection $C_1$. If guided, the operation returns to step ST12 to repeat the detection of the current position and the later operations.

On the other hand, if not guided, the operation branches to step ST15 to detect a guide target intersection $C_2$ (corresponding to the guide target intersection 15 shown in FIG. 4) next to the front guide target intersection $C_1$. Further, the operation proceeds to step ST16 to detect a road distance $L_1$ between the front guide target intersection $C_1$ and the next guide target intersection $C_2$. Subsequently, in step ST17, it is decided whether or not the distance $L_1$ is less than the specified value $L_R$ (of, for example, 300 m). If less than the specified value $L_R$, the operation branches to step ST18 to output guides about the front guide target intersection $C_1$ and the next guide target intersection $C_2$. Thereafter, in step ST19, it is recorded that the guide about the next guide target intersection $C_2$ has been outputted. When the guides are outputted in step ST18, as shown in FIG. 6, the intersection information map about the guide target intersection $C_1$ in front of the mobile unit and the next guide target intersection $C_2$ is displayed. Concurrently, there is outputted the following voice message about the guide target intersection $C_1$ in front of the mobile unit and the next guide target intersection $C_2$ as shown in FIG. 8: "Turn to the right presently. Turn to the left beyond the turn." Alternatively, when the guide is outputted, it is sufficient to display only the intersection information map about the front guide target intersection $C_1$ and the next guide target intersection $C_2$ shown in FIG. 6.

On the other hand, when the distance $L_1$ is equal to or more than the specified value $L_R$ as a result of decision in step ST17, the operation branches to step ST20 to output a guide about the guide target intersection $C_1$ in front of the mobile unit. When the guide is outputted, the intersection information map about the front guide target intersection $C_1$ is displayed as shown in FIG. 7, and there is outputted the following voice message about the front guide target intersection C1 shown in FIG. 8: "Turn to the right presently." As in the above case, it is sufficient to display only the intersection information map about the front guide target intersection $C_1$ as shown in FIG. 7. In subsequent steps, the operation returns to step ST12 to repeat the series of processing until end of the path is detected in step ST21.

As set forth above, according to the embodiment 1, when the distance $L_1$ between the guide target intersections $C_1$ and $C_2$ is less than the specified value $L_R$, the guides about the guide target intersections $C_1$ and $C_2$ are concurrently displayed. Thus, there is an effect in that the guide about the next guide target intersection $C_2$ can previously be displayed for a driver in case of the short distance between the guide target intersections $C_1$ and $C_2$.

Embodiment 2

FIG. 9 is a block diagram showing a functional structure of a navigation apparatus according to the embodiment 2 of the present invention. The same reference numerals as those in FIG. 1 are used for component parts identical with those in the embodiment 1, and descriptions thereof are omitted. In the drawing, reference numeral 29 means a specified value determining unit disposed in a guide unit 4 to detect a road attribute between two adjacent guide target intersections, and determine a specified value used to select guide output depending upon the road attribute. The guide unit 4 differs from a guide unit 4 of the embodiment 1 shown in FIG. 1 in that the former includes the specified value determining unit 29.

Figure 10:
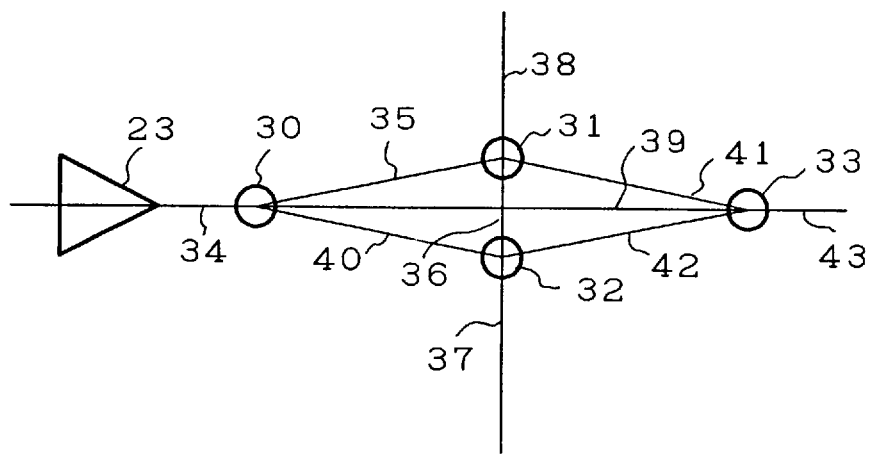
FIG. 10 is an explanatory view showing one illustrative actual path set in the embodiment 2 of the present invention.

FIG. 10 is an explanatory view showing one illustrative actual path set by a path setting unit 2. In the drawing, reference numerals 30 and 31 mean guide target intersections determined by the guide unit 4, and 32 and 33 are intersections other than the guide target intersections 30 and 31, 34 to 37 are path roads, and 38 to 43 are roads other than the path roads 34 to 37, connected to the intersections 30 to 33. As in the case of FIG. 4, reference numeral 23 means a current position showing a position of a mobile unit.

FIG. 11 is a flowchart showing a flow of processing in the navigation apparatus according to the embodiment 2. In the drawing, reference numerals ST22 to ST34 mean steps showing the units of processing.

Figure 12:
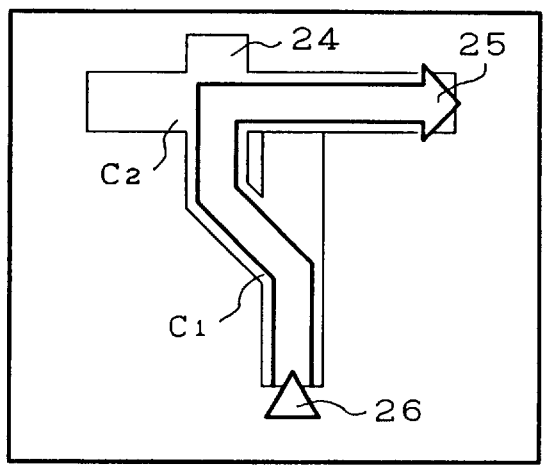
FIG. 12 is an explanatory view showing one illustrative intersection information map displayed in the embodiment 2 of the present invention.

FIG. 12 is an explanatory view showing one illustrative intersection information map displayed by the guide unit 4. In the drawings, as in the embodiment 1 shown in FIGS. 6 and 7, reference numeral 24 means shapes of a guide target intersection and a road between the guide target intersections, 25 is a direction of travel from the guide target intersection, and 26 is the current position 23 of the mobile unit shown in FIG. 10.

A description will now be given of the operation. As in the embodiment 1, in step ST22, the path setting unit 2 sets two points on a map, and sets a path between the two points by using, for example, Dijkstra's algorithm. Subsequently, in step ST23, a current position detecting unit 3 detects the current position. Next, in step ST24, the guide unit 4 extracts the closest right-turning/left-turning guide target intersection $C_1$ in front of the mobile unit. In step ST25, it is decided whether or not a driver has been guided to the front guide target intersection $C_1$. As a result, if not guided, the operation branches to step ST26 to detect a guide target intersection $C_2$ next to the front guide target intersection $C_1$. In step ST27, a road attribute between the front guide target intersection $C_1$ and the next guide target intersection $C_2$ is detected. Subsequently, the operation proceeds to step ST28 where the specified value determining unit 29 determines a predetermined specified value $L_R$ (for example, of 300 m in case of a general automobile road, or of 400 m in case of a ramp or a by-pass) used to make a distance decision depending upon the road attribute.

In general, even when there is the ramp or the by-pass between the guide target intersections, the mobile unit such as vehicle enters the next guide target intersection in front of the current position without deceleration. Hence, the specified value determining unit 29 determines the specified value $L_R$ depending upon the road attribute as described above, resulting in, for example, the specified value $L_R$ of 300 m in case of the general automobile road, and of 400 m in case of the ramp or the by-pass.

Thereafter, as in the embodiment 1, the operation proceeds to step ST29 to detect a distance $L_1$ between the front guide target intersection $C_1$ and the next guide target intersection $C_2$. Subsequently, in step ST30, it is decided whether or not the distance $L_1$ is less than the specified value $L_R$. If less than the specified value $L_R$, the operation proceeds to step ST31 to output guides about the front guide target intersection $C_1$ and the next guide target intersection $C_2$. In step ST32, it is recorded that the guide about the next guide target intersection $C_2$ has been outputted. When the guides are outputted, as shown in FIG. 12, the intersection information map about the front guide target intersection $C_1$ and the next guide target intersection $C_2$ is displayed. Concurrently, there are outputted the voice messages about the front guide target intersection $C_1$ and the next guide target intersection $C_2$ as shown in FIG. 8 in the embodiment 1. In this case, when the guide is outputted, it is sufficient to display only the intersection information map shown in FIG. 12, or output only the voice message without display of the intersection information map.

On the other hand, when it is decided in step ST30 that the distance $L_1$ is equal to or more than the specified value $L_R$, as in the embodiment 1, the operation proceeds to step ST33 to output the guide about the front guide target intersection $C_1$ through either one or both of the intersection information map as shown in FIG. 7 and the voice message shown in FIG. 8. In subsequent steps, the operation returns to step ST23 to repeat the series of processing until end of the path is detected in step ST34.

As set forth above, according to the embodiment 2, when the specified value $L_R$ is determined depending upon the road attribute between the guide target intersections $C_1$ and $C_2$. When the distance $L_1$ between the guide target intersections $C_1$ and $C_2$ is less than the specified value $L_R$, it is possible to concurrently provide the guides about the guide target intersections $C_1$ and $C_2$. As a result, there is an effect in that it is possible to provide the guide in closer touch with sensibility of the driver.

Embodiment 3

Figure 13:
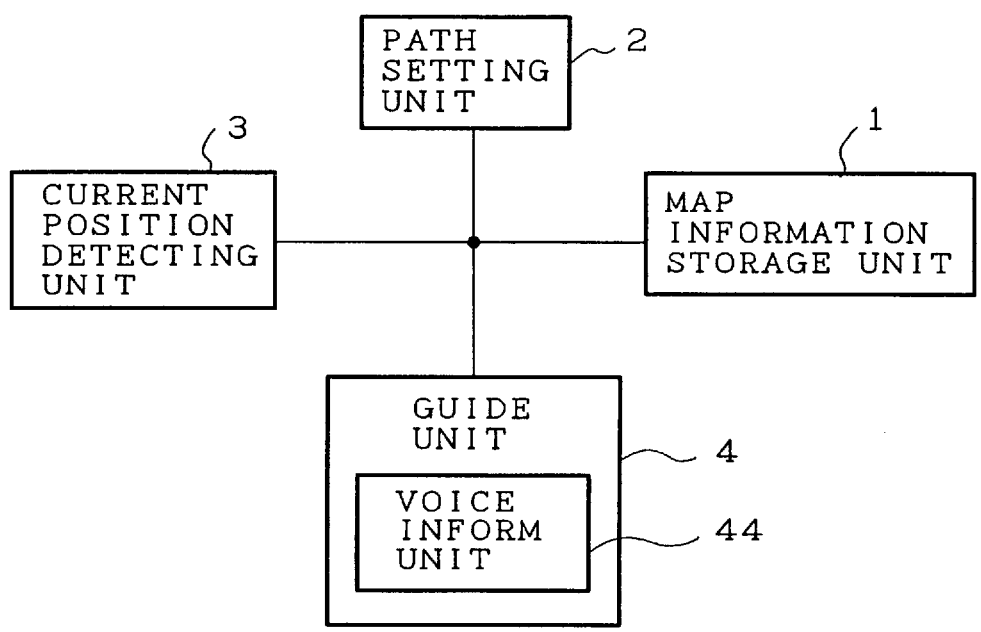
FIG. 13 is a block diagram showing a functional structure of a navigation apparatus according to the embodiment 3 of the present invention.

FIG. 13 is a block diagram showing a functional structure of a navigation apparatus according to the embodiment 3 of the present invention. The same reference numerals as those in FIG. 1 are used for component parts equivalent to those in embodiment 1, and descriptions thereof are omitted. In the drawing, reference numeral 44 means a voice inform unit disposed in a guide unit 4 to select a voice message including a word showing a distance between two adjacent guide target intersections detected in the guide unit 4, and inform of the voice message through voice. The guide unit 4 differs from a guide unit 4 of the embodiment 1 shown in FIG. 1 in that the former includes the voice inform unit 44.

Figures 14, 15:
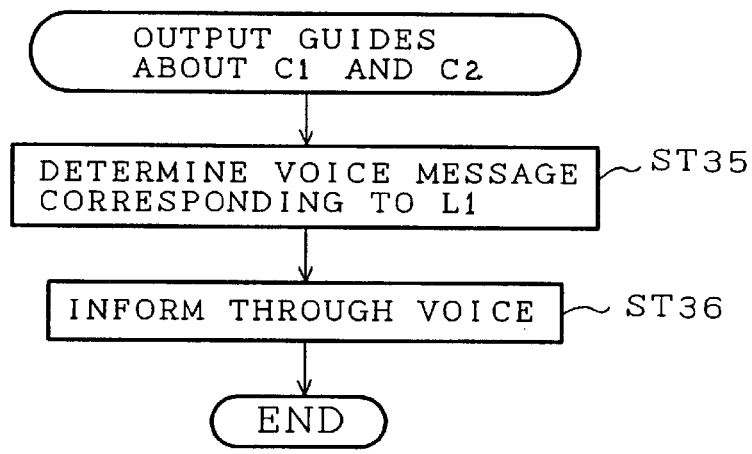
FIG. 14 is a flowchart showing an essential part of a flow of processing in the embodiment 3 of the present invention.
FIG. 15 is an explanatory view showing one illustrative voice message used to inform in the embodiment 3 of the present invention.

FIG. 14 is a flowchart of a flow of processing in the navigation apparatus according to the embodiment 3, showing only an essential part thereof. In the drawing, reference numerals ST35 and ST36 mean steps showing the units of processing.

FIG. 15 is an explanatory view showing the illustrative contents of the voice message outputted from the guide unit 4 corresponding to a guide condition. In the drawing, reference numeral 45 means a distance range used to select the contents of the voice message at a time of informing through the voice, and 46 is the illustrative contents of the voice message.

A description will now be given of the operation. The processing shown in the flowchart of FIG. 14 is equivalent to step ST18 in the processing in the embodiment 1 shown in the flowchart of FIG. 5. In FIG. 5, when it is decided in step ST17 that a distance $L_1$ is within a specified value $L_R$, the voice inform unit 44 determines the contents the voice message of which a driver should be informed depending upon the distance $L_1$ between the closest right-turning/left-turning guide target intersection $C_1$ in front of the mobile unit, which has been detected in step ST16 of FIG. 5, and the next guide target intersection $C_2$ in step ST35, and informs of the message through the voice in step ST36. Thereby, when the distance between the front guide target intersection $C_1$ and the next guide target intersection $C_2$ located on a path as shown in FIG. 6 is less than 100 m, there is outputted a voice message: "Turn to the right presently. Turn to the left shortly." In case of the distance of 100 m or more, and less than 200 m, there is outputted another voice message: "Turn to the right presently. Turn to the left beyond the turn." In case of the distance of 200 m or more, and less than the specified value $L_R$, there is outputted a further voice message: "Turn to the right. Turn to the left later."

As set forth above, according to the embodiment 3, the voice messages used for the guide include the words such as "shortly," "beyond," and "later" suggesting the distance $L_1$ between the adjacent guide target intersections $C_1$ and $C_2$. As a result, there is an effect in that the driver can intuitively grasp the distance $L_1$ between the successive guide target intersections $C_1$ and $C_2$ by simply hearing the voice message.

Embodiment 4

Figure 16:
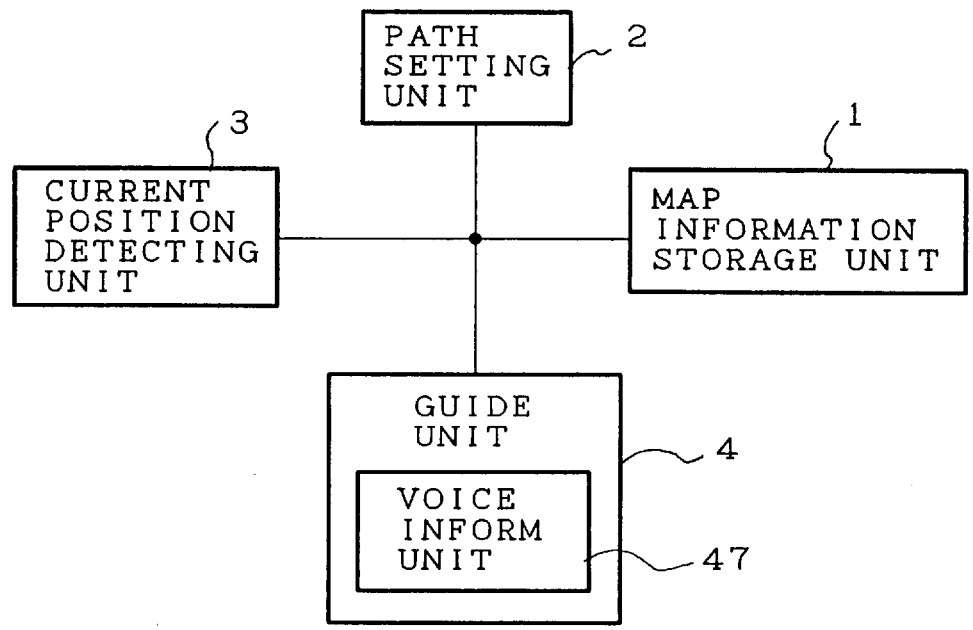
FIG. 16 is a block diagram showing a functional structure of a navigation apparatus according to the embodiment 4 of the present invention.

FIG. 16 is a block diagram showing a functional structure of a navigation apparatus according to the embodiment 4 of the present invention. The same reference numerals as those in FIG. 1 are used for component parts equivalent to those in embodiment 1, and descriptions thereof are omitted. In the drawing, reference numeral 47 means a voice inform unit disposed in a guide unit 4 to detect a road attribute between two adjacent guide target intersections, and select a voice message including a word showing the road attribute so as to inform of the voice message through voice. The guide unit 4 differs from a guide unit 4 of the embodiment 1 shown in FIG. 1 in that the former includes the voice inform unit 47.

Figure 17:
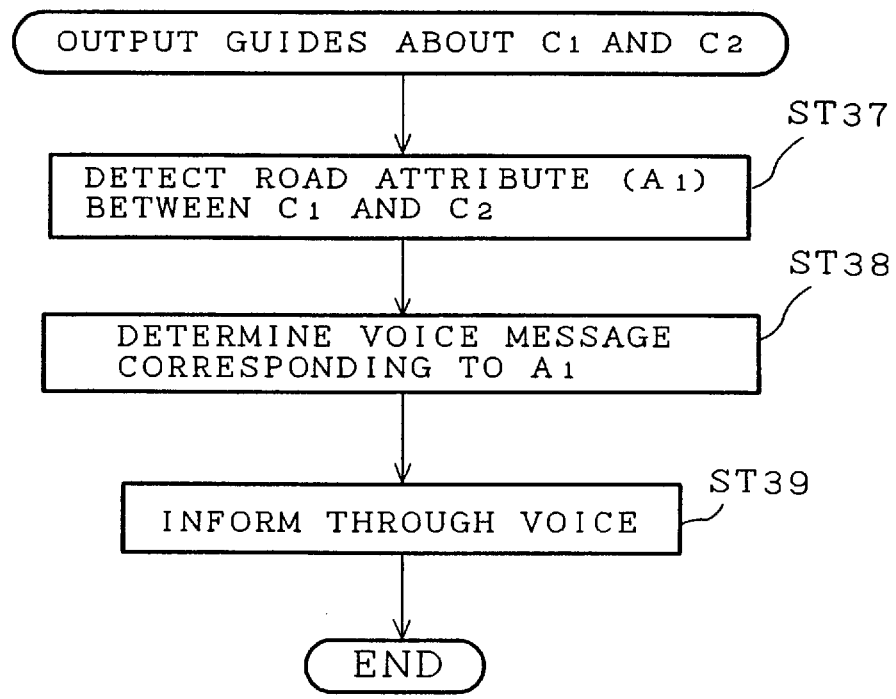
FIG. 17 is a flowchart showing an essential part of a flow of processing in the embodiment 4 of the present invention.

FIG. 17 is a flowchart of a flow of processing in the navigation apparatus according to the embodiment 4, showing only an essential part thereof. In the drawing, reference numerals ST37 to ST39 mean steps showing the units of processing.

Figures 18, 19:
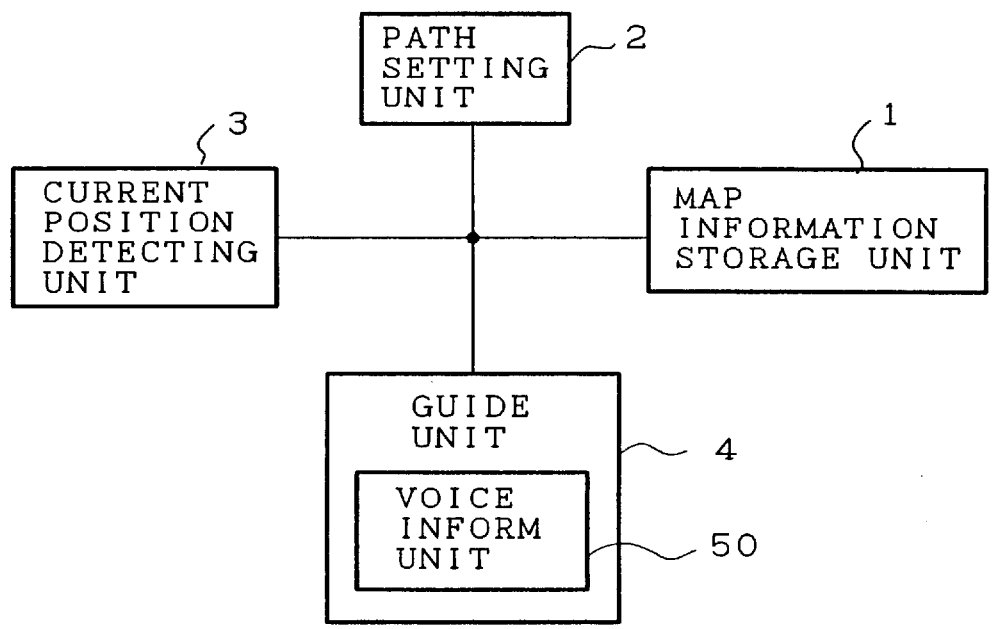
FIG. 18 is an explanatory view showing one illustrative voice message used to inform in the embodiment 4 of the present invention.
FIG. 19 is a block diagram showing a functional structure of a navigation apparatus according to the embodiment 5 of the present invention.

FIG. 18 is an explanatory view showing the illustrative contents of the voice message outputted from the guide unit 4 corresponding to a guide condition. In the drawing, reference numeral 48 means a road attribute used to select the contents of the voice message at a time of informing through the voice, and 49 is the illustrative contents of the voice message.

A description will now be given of the operation. The processing shown in the flowchart of FIG. 17 is equivalent to step ST18 in the processing in the embodiment 1 shown in the flowchart of FIG. 5. In FIG. 5, when it is decided in step ST17 that a distance $L_1$ is within a specified value $L_R$, the voice inform unit 47 detects a road attribute $A_1$ between the closest right-turning/left-turning guide target intersection $C_1$, in front of the mobile unit and the next guide target intersection $C_2$ in step ST37. Subsequently, the voice inform unit 47 determines the contents of the voice message of which a driver should be informed depending upon the detected road attribute $A_1$ in step ST38, and informs of the message through the voice in step ST39. Thereby, when the road attribute $A_1$ between the front guide target intersection $C_1$ and the next guide target intersection $C_2$ located on a path as shown in FIG. 6 is a main road, there is outputted a voice message: "Turn to the right presently. Turn to the left beyond the turn." When the road attribute $A_1$ between the front guide target intersection $C_1$ and the next guide target intersection $C_2$ on a path as shown in FIG. 12 is a ramp, there is outputted another voice message: "Turn to the right after taking a left-hand by-pass presently."

As set forth above, according to the embodiment 4, it is possible to change the voice message for the guide according to the road attribute $A_1$ between the guide target intersections $C_1$ and $C_2$. As a result, there is an effect in that it is possible to more accurately guide to the path than would be in case where only a direction of travel is informed.

Embodiment 5

FIG. 19 is a block diagram showing a functional structure of a navigation apparatus according to the embodiment 5 of the present invention. The same reference numerals as those in FIG. 1 are used for component parts equivalent to those in embodiment 1, and descriptions thereof are omitted. In the drawing, reference numeral 50 means a voice inform unit disposed in a guide unit 4 to detect directions of travel at two adjacent guide target intersections, and select a voice message on the basis of a combination of the directions of travel so as to inform of the selected voice message through voice. The guide unit 4 differs from a guide unit 4 of the embodiment 1 shown in FIG. 1 in that the former includes the voice inform unit 50.

Figures 20, 21:
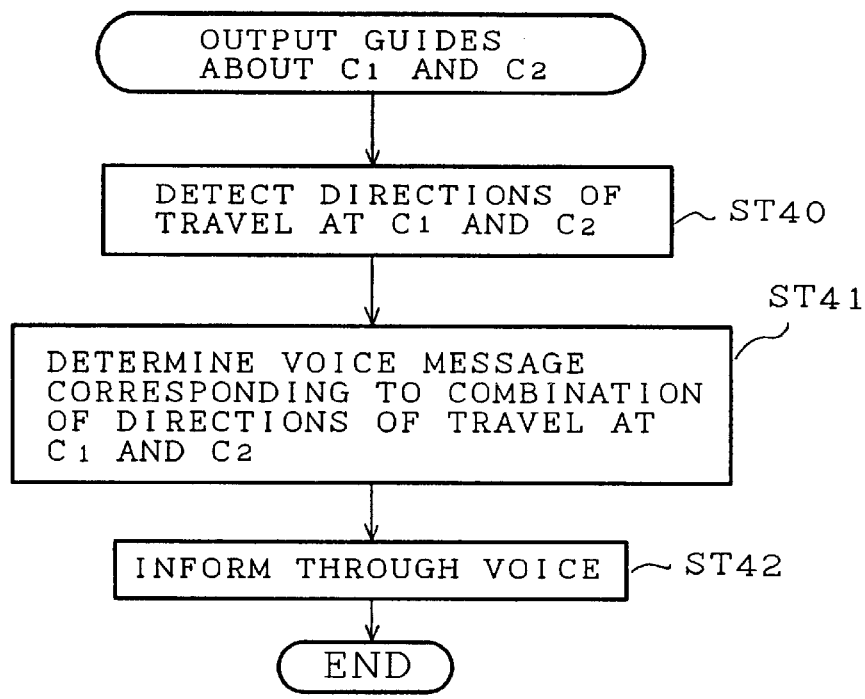
FIG. 20 is a flowchart showing an essential part of a flow of processing in the embodiment 5 of the present invention.
FIG. 21 is an explanatory view showing one illustrative voice message used to inform in the embodiment 5 of the present invention.

FIG. 20 is a flowchart of a flow of processing in the navigation apparatus according to the embodiment 5, showing only an essential part thereof. In the drawing, reference numerals ST40 to ST42 mean steps showing the units of processing.

FIG. 21 is an explanatory view showing the illustrative contents of the voice message outputted from the guide unit 4 corresponding to a guide condition. In the drawing, reference numeral 51 means the combination of the directions of travel used to select the contents of the voice message at a time of informing through the voice, and 52 is the illustrative contents of the voice message.

A description will now be given of the operation. The processing shown in the flowchart of FIG. 20 is equivalent to step ST18 in the processing in the embodiment 1 shown in the flowchart of FIG. 5. In FIG. 5, when it is decided in step ST17 that a distance $L_1$ is within a specified value $L_R$, the voice inform unit 50 detects the directions of travel at a guide target intersection $C_1$ in front of a mobile unit and the next guide target intersection $C_2$ in step ST40. Subsequently, the voice inform unit 50 determines the contents of the voice message of which a driver should be informed depending upon the combination of the detected directions of travel in step ST41, and informs of the message through the voice in step ST42. Thereby, when the right is detected as both the directions of travel at the guide target intersection $C_1$ in front of the mobile unit and the next guide target intersection $C_2$, there is outputted a voice message: "Turn to the right presently. Turn to the right beyond the turn." When the direction of travel at the guide target intersection $C_1$ in front of the mobile unit is the right and the direction of travel at the next guide target intersection $C_2$ is the left, there is outputted another voice message: "Turn to the right presently. Turn to the left beyond the turn."

As set forth above, according to the embodiment 5, it is possible to change the voice message for the guide according to the combination of the directions of travel at the two guide target intersections $C_1$ and $C_2$. As a result, there is an effect in that it is possible to more accurately inform the driver of a relationship between the directions of travel at the two guide target intersections through the voice.

Embodiment 6

Figure 22:
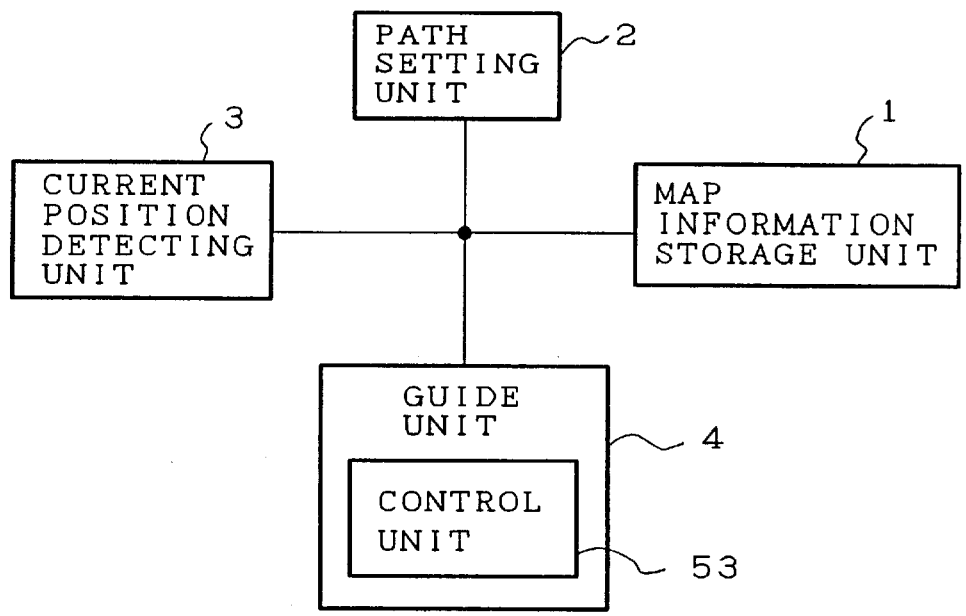
FIG. 22 is a block diagram showing a functional structure of a navigation apparatus according to the embodiment 6 of the present invention.

FIG. 22 is a block diagram showing a functional structure of a navigation apparatus according to the embodiment 6 of the present invention. The same reference numerals as those in FIG. 1 are used for component parts equivalent to those in embodiment 1, and descriptions thereof are omitted. In the drawing, reference numeral 53 means a control unit disposed in a guide unit 4 to detect whether or not a distance between guide target intersections to which a driver has been guided is equal to or more than a specified value $L_{R2}$ smaller than a specified value $L_R$. When equal to or more than the specified value $L_{R2}$, the control unit 53 informs of the guide target intersection on the destination side through the voice once again after a current position passes by the guide target intersection on the start point side. The guide unit 4 differs from a guide unit 4 of the embodiment 1 shown in FIG. 1 in that the former includes the control unit 53.

Figure 23:
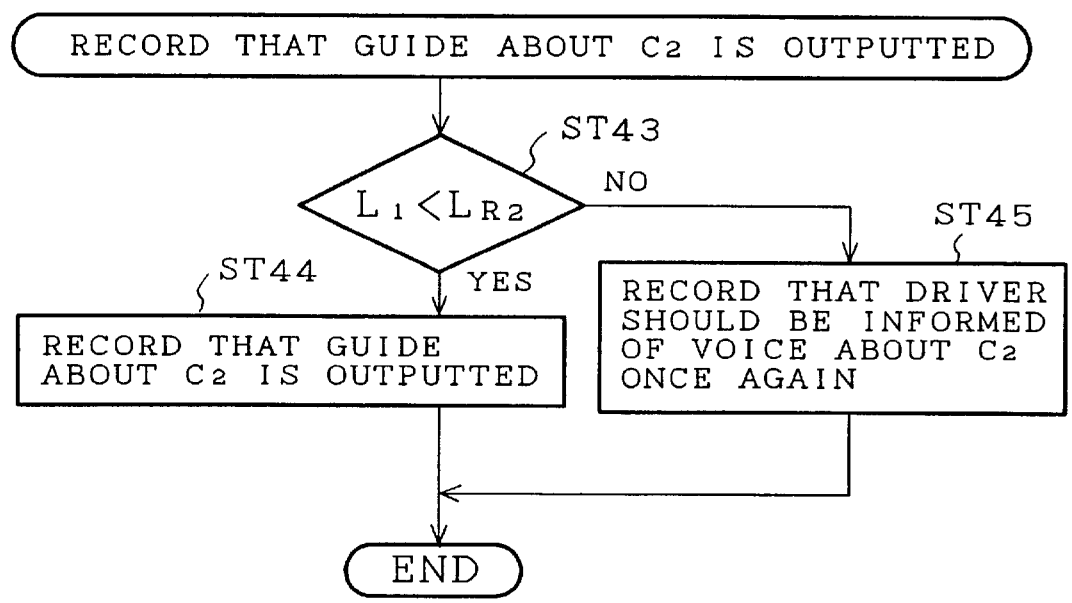
FIG. 23 is a flowchart showing an essential part of a flow of processing in the embodiment 6 of the present invention.

FIG. 23 is a flowchart of a flow of processing in the navigation apparatus according to the embodiment 6, showing only an essential part thereof. In the drawing, reference numerals ST43 to ST45 mean steps showing the units of processing.

A description will now be given of the operation. The processing shown in the flowchart of FIG. 23 is equivalent to step ST19 in the processing in the embodiment 1 shown in the flowchart of FIG. 5. In step ST17, it is decided that a distance $L_1$ between the two guide target intersections $C_1$ and $C_2$ detected in step ST16 of FIG. 5 is within the specified value $L_R$ (of, for example, 300 m). Thereafter, the operation proceeds to step ST18 to output guide messages about the two guide target intersections $C_1$ and $C_2$. Then, in step ST43, the control unit 53 decides whether or not the distance $L_1$ is less than the specified value $L_{R2}$ (of, for example, 100 m). As a result, if less than the specified value $L_{R2}$, the operation branches to step ST44 to record that the guide about the next guide target intersection $C_2$ has been outputted. On the other hand, if the distance $L_1$ is equal to or more than the specified value $L_{R2}$, the operation branches to step ST45 to record that the driver should be informed of only the voice message about the guide target intersection $C_2$ once again.

As set forth above, if the distance $L_1$ between the two guide target intersections $C_1$ and $C_2$ is equal to or more than the specified value $L_{R2}$, it is recorded in step ST45 that the driver should be informed of only the voice message about the guide target intersection $C_2$ once again. After the mobile unit passes by the guide target intersection $C_1$, the navigation apparatus may newly detect the guide target intersection $C_2$ to which the driver has been guided as a front guide target intersection $C_1$ closest to the current position. Even in such a case, a condition is false in step ST14 shown in the flowchart of FIG. 5 because it is recorded that the driver should be informed of only the voice message once again. Thus, it is possible to inform of the voice message once again in step ST18 or ST20.

Alternatively, the specified value $L_{R2}$ used in step ST43 in the flowchart of FIG. 23 may be found depending upon a road attribute as in steps ST27 and ST28 to calculate a specified value $L_R$ in the flowchart of FIG. 11 in the embodiment 2, and may be, for example, 100 m in case of a general automobile road or 150 m in case of a ramp or a by-pass.

As set forth above, according to the embodiment 6, in case of a long distance from a point at which the guides about the adjacent guide target intersections $C_1$ and $C_2$ are provided, to the guide target intersection $C_2$ on the destination side, the voice message can be provided once again. As a result, there is an effect in that it is possible to inform a driver of the message once again even when the driver starts to forget the message.

Embodiment 7

Figure 24:
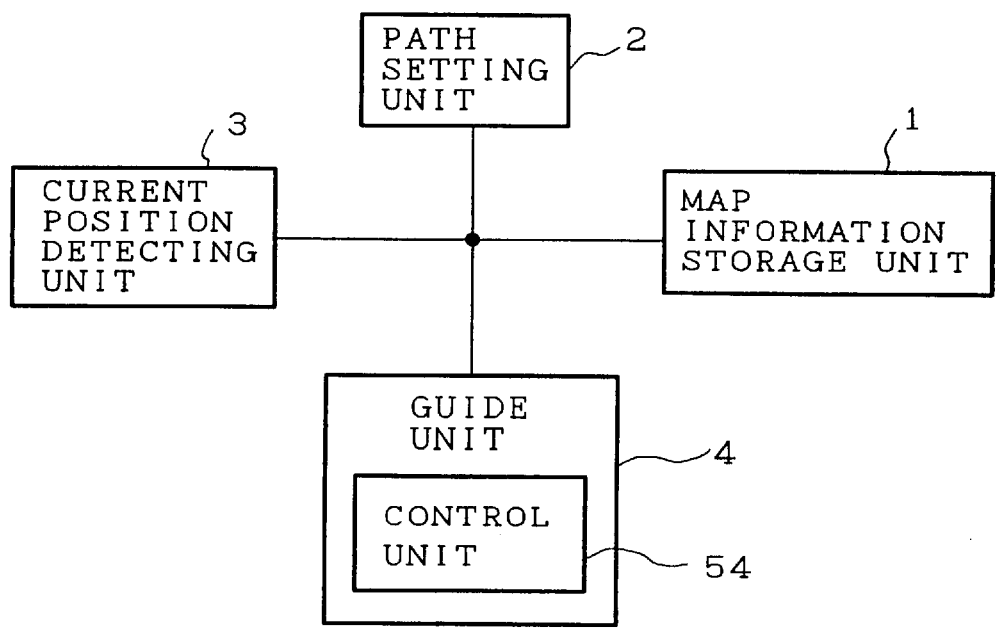
FIG. 24 is a block diagram showing a functional structure of a navigation apparatus according to the embodiment 7 of the present invention.

FIG. 24 is a block diagram showing a functional structure of a navigation apparatus according to the embodiment 7 of the present invention. The same reference numerals as those in FIG. 1 are used for component parts equivalent to those in embodiment 1, and descriptions thereof are omitted. In the drawing, reference numeral 54 means a control unit disposed in a guide unit 4. A predetermined time or more may be elapsed before a mobile unit passes by a guide target intersection on the start point side after a driver are informed of guide messages about a plurality of guide target intersections. In such a case, the control unit 54 informs of the guide message about the guide target intersection on the destination side once again after a current position of the mobile unit passes by the guide target intersection on the start point side. The guide unit 4 differs from a guide unit 4 of the embodiment 1 shown in FIG. 1 in that the former includes the control unit 54.

Figure 25:
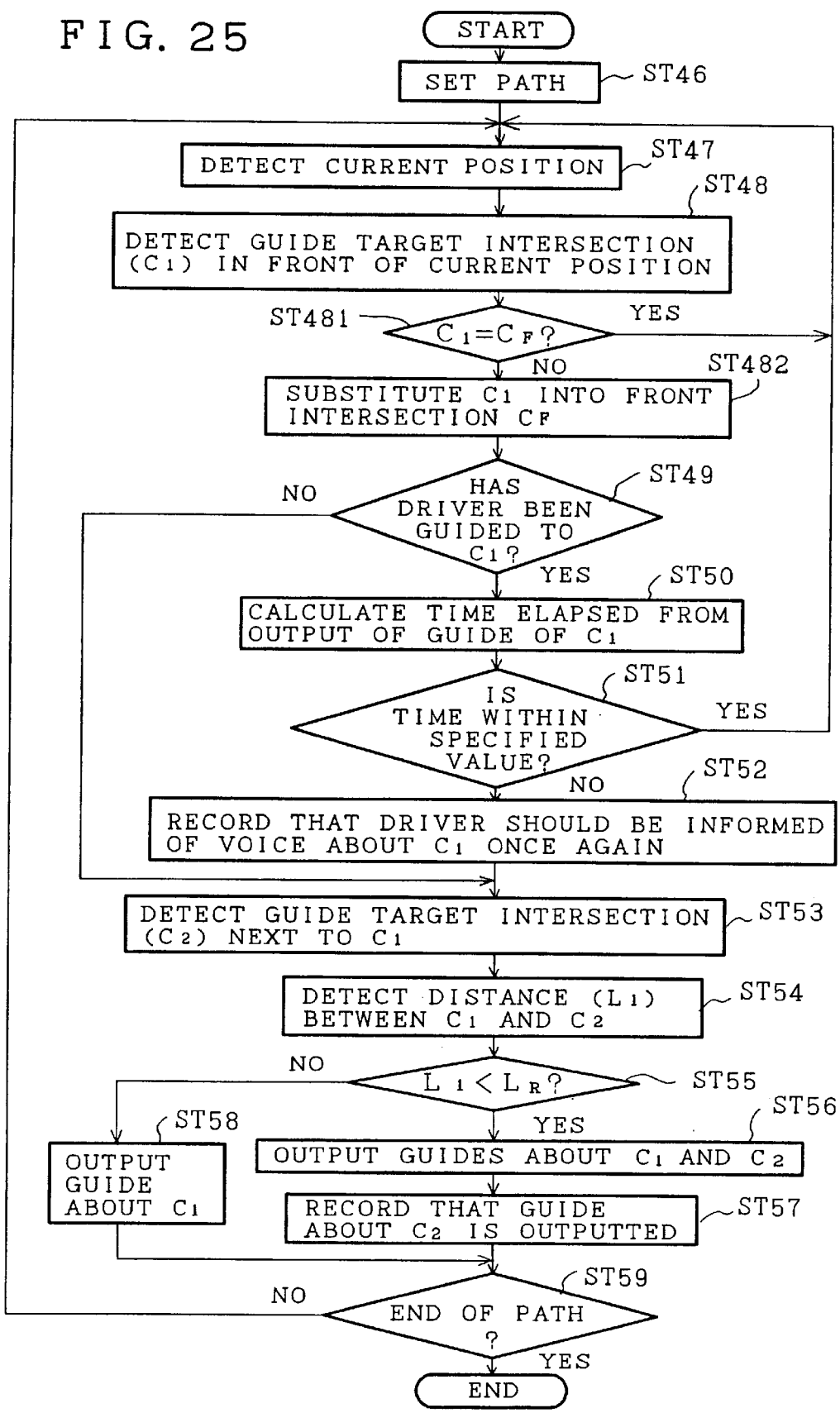
FIG. 25 is a flowchart showing a flow of processing in the embodiment 7 of the present invention.

FIG. 25 is a flowchart showing a flow of processing in the navigation apparatus according to the embodiment 7. In the drawing, reference numerals ST46 to ST59 mean steps showing the units of processing.

A description will now be given of the operation. As in the embodiment 1, a path setting unit 2 sets two points on a map, and sets a path therebetween by using, for example, Dijkstra's algorithm in step ST46. Subsequently, in step ST47, a current position detecting unit 3 detects the current position. Next, in step ST48, the guide unit 4 extracts the front guide target intersection $C_1$ closest to the mobile unit. In step ST481, it is decided whether or not the extracted front guide target intersection $C_1$ is a front guide target intersection $C_F$ which has been measured. As a result, if the front guide target intersection $C_1$ is not the front guide target intersection $C_F$ which has been measured, and the front guide target intersection $C_1$ is changed, the operation branches to step ST482 to substitute the front guide target intersection $C_1$ newly detected in step ST48 into the front guide target intersection $C_F$ which has been measured. It is decided in step ST49 whether or not the driver has been guided to the front guide target intersection $C_1$. If guided, the operation branches to step ST50 to calculate how much time has elapsed since the driver has been informed of the guide. Further, it is decided in step ST51 whether or not the time exceeds a specified value (of, for example, 60 seconds). If the elapsed time is within the specified value, the operation returns to step ST47 to repeat the detection of the current position and the later operations. Further, if the time is equal to or more than the specified value as a result of decision in step ST51, the operation branches to step ST52 to record that the driver should be informed of a voice message about the front guide target intersection $C_1$ once again, thereafter proceeding to step ST53.

On the other hand, if not guided as a result of decision in step ST49, the operation directly proceeds to step ST53.

Further, if the front guide target intersection $C_1$ is not changed as a result of decision in step ST481, the operation returns to step ST47 to repeat the detection of the current position and the later operations.

The operation hereinafter proceeds as in the embodiment 1. In step ST53, a guide target intersection $C_2$ next to the front guide target intersection $C_1$ is detected. In step ST54, a distance $L_1$ between the guide target intersections $C_1$ and $C_2$ is detected. Subsequently, in step ST55, it is decided whether or not the distance $L_1$ is less than a specified value $L_R$. If less than the specified value $L_R$, guides about the front guide target intersection $C_1$ and the next guide target intersection $C_2$ are outputted in step ST56. Thereafter, in step ST57, it is recorded that the guide about the guide target intersection $C_2$ has been outputted. The guides are outputted through either one or both of the intersection information map as shown in FIG. 6, and the voice messages about the front guide target intersection $C_1$ and the next guide target intersection $C_2$ shown in FIG. 8. Further, if it is decided in step ST55 that the distance $L_1$ is equal to or more than the specified value $L_R$, the guide about the front guide target intersection $C_1$ is outputted in step ST58 through either one or both of the intersection information map as shown in FIG. 7 and the guide voice shown in FIG. 8. In subsequent steps, the operation returns to step ST47 to repeat the series of processing until end of the path is detected in step ST59.

As described above, when it is detected in step ST51 that the predetermined time or more is elapsed before the guide target intersection on the start point side is passed by after the driver is informed of the guide messages about the plurality of guide target intersections, it is recorded in step ST52 that the driver should be informed of the voice message about the guide target intersection on the destination side once again. It is thereby possible to inform of the voice message once again in step ST56 or ST58.

Alternatively, the specified value used in step ST51 may be found depending upon a road attribute as in steps ST27 and ST28 to calculate a specified value $L_R$ in the flowchart of FIG. 11 in the embodiment 2, and may be, for example, 60 seconds in case of a general automobile road or 90 seconds in case of a ramp or a by-pass.

As set forth above, according to the embodiment 7, when the predetermined time or more is elapsed before the closest right-turning/left-turning guide target intersection on the start point side is passed by after the guide messages about the adjacent guide target intersections are outputted, the voice message about the guide target intersection $C_2$ on the destination side is outputted once again. As a result, there is an effect in that it is possible to inform the driver of the message once again even when the driver starts to forget the message.

Embodiment 8

Figure 26:
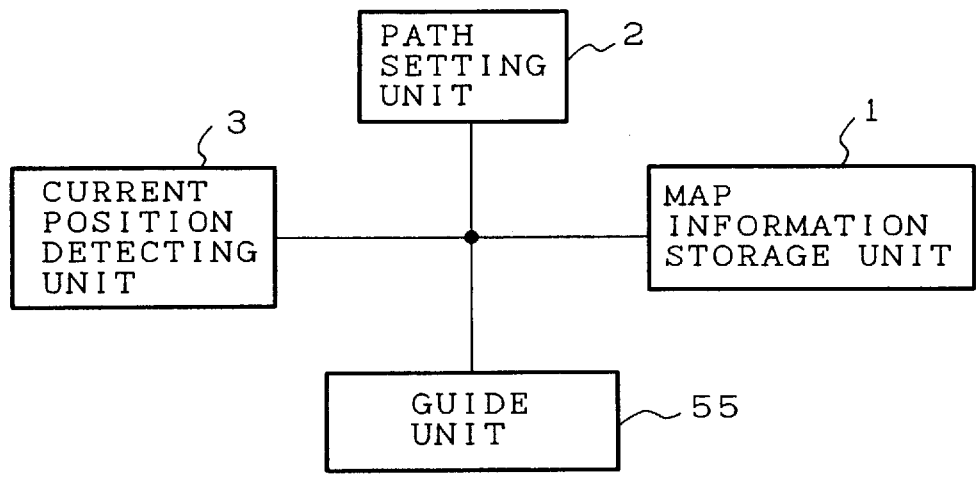
FIG. 26 is a block diagram showing a functional structure of a navigation apparatus according to the embodiment 8 of the present invention.

FIG. 26 is a block diagram showing a functional structure of a navigation apparatus according to the embodiment 8 of the present invention. The same reference numerals as those in FIG. 1 are used for component parts identical with those in embodiment 1, and descriptions thereof are omitted. In the drawing, reference numeral 55 means a guide unit which differs from a guide unit shown by reference numeral 4 in FIG. 1 in the following ways. That is, depending upon map data stored in a map information storage unit 1 and a path set in a path setting unit 2, the guide unit 55 extracts a guide target intersection located on the path and to which a driver should be guided. Further, depending upon the extracted guide target intersection, the map data stored in the map information storage unit 1 and the path set in the path setting unit 2, the guide unit 55 displays together with the guide target intersection intersections except the guide target intersection, located on the path between the guide target intersection and a current position of a mobile unit equipped with the navigation apparatus.

Figure 27:
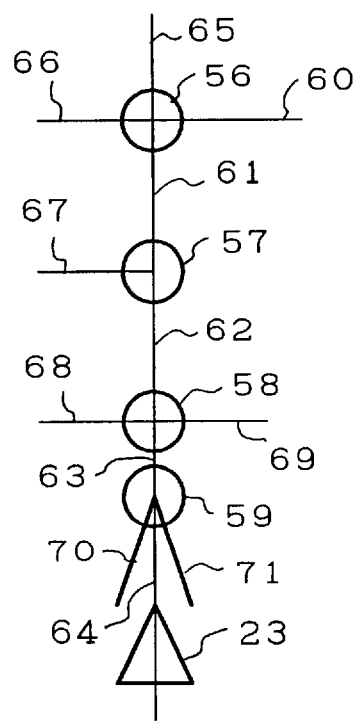
FIG. 27 is an explanatory view showing one illustrative actual path set in the embodiment 8 of the present invention.

FIG. 27 is an explanatory view showing one illustrative actual path set in the path setting unit 2. In the drawing, reference numeral 56 means the guide target intersection extracted by the guide unit 55, and 57 to 59 are the intersections except the guide target intersection 56. Reference numerals 60 to 64 mean path roads, and 65 to 71 are roads except the path roads 60 to 64, connected to the intersections 56 to 59. Further, reference numeral 23 means the current position showing a position of the mobile unit.

Figure 28:
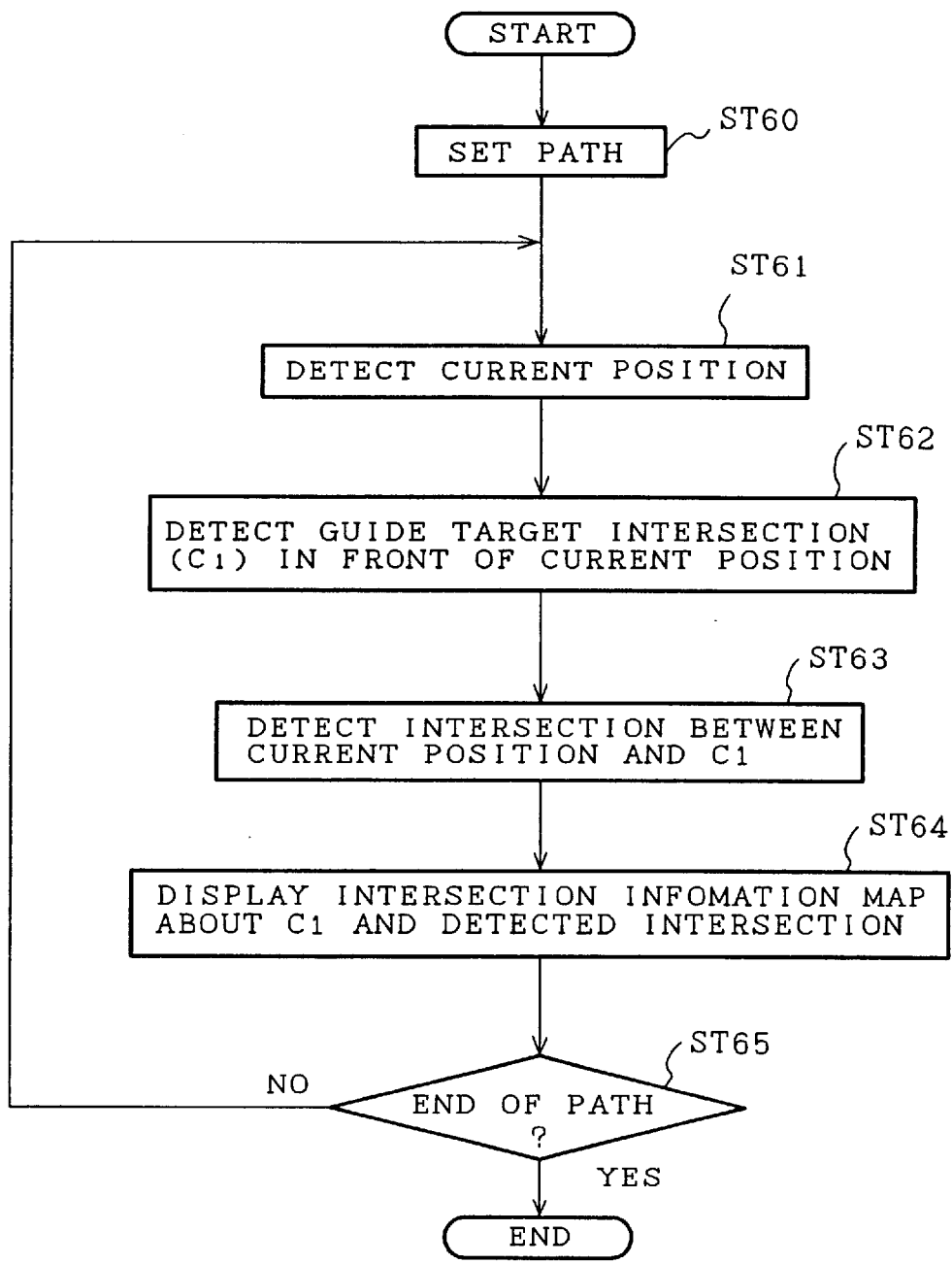
FIG. 28 is a flowchart showing a flow of processing in the embodiment 8 of the present invention.

FIG. 28 is a flowchart showing a flow of processing in the navigation apparatus according to the embodiment 8. In the drawing, reference numerals ST60 to ST65 mean steps showing the units of processing.

Figure 29:
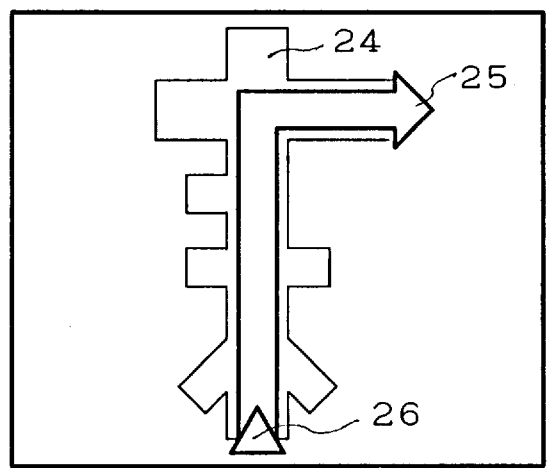
FIG. 29 is an explanatory view showing one illustrative intersection information map displayed in the embodiment 8 of the present invention.

FIG. 29 is an explanatory view showing one illustrative intersection information map displayed by the guide unit 55. In the drawing, as in the embodiment 1 shown in FIGS. 6 and 7, reference numeral 24 means a shape of the road, 25 is a direction of travel from the guide target intersection, and 26 shows a current position 23 of the mobile unit shown in FIG. 27. In this case, the road shape 24 shows the shape of the road connected to the guide target intersection and the intersections except the guide target intersection.

A description will now be given of the operation. In step ST60, the path setting unit 2 sets two points on the map data through latitude and longitude, or the like, and sets a path between the two points by using, for example, Dijkstra's algorithm. Subsequently, in step ST61, a current position detecting unit 3 detects the current position of the mobile unit. Thereafter, in step ST62, the guide unit 55 extracts intersections in front of the current position detected by the current position detecting unit 3 from among the intersections located on the set path and the two points set by the path setting unit 2. Further, the guide unit 55 detects from among the extracted intersections, for example, the closest right-turning/left-turning front guide target intersection with three or more roads connected to the intersection as a guide target intersection $C_1$ (corresponding to the intersection 56 shown in FIG. 27). Subsequently, the operation proceeds to step ST63 to detect the intersections (corresponding to the intersections 57 to 59 shown in FIG. 27) except the guide target intersection $C_1$ between the current position and the guide target intersection $C_1$, thereafter proceeding to step ST64 to display an intersection information map about the guide target intersection $C_1$ and the intersections except the guide target intersection $C_1$. In this case, as shown in FIG. 29, in the displayed intersection information map, information about the guide target intersection $C_1$ and the intersections except the guide target intersection $C_1$ located between the guide target intersection $C_1$ and the current position are deformed and displayed. In subsequent steps, the operation returns to step ST61 to repeat the series of processing until end of the path is detected in step ST65.

Further, in the intersection information map displayed in step ST64, as shown in FIG. 29, the road connected to the guide target intersection $C_1$ and the road connected to the intersections except the guide target intersection may be displayed with either one or both of width and length deformed.

As set forth above, according to the embodiment 8, it is possible to display the intersections between the closest right-turning/left-turning guide target intersection $C_1$ and the current position. As a result, there is an effect in that it is possible to intelligibly inform a driver of the position of the guide target intersection $C_1$.

Embodiment 9

Figure 30:
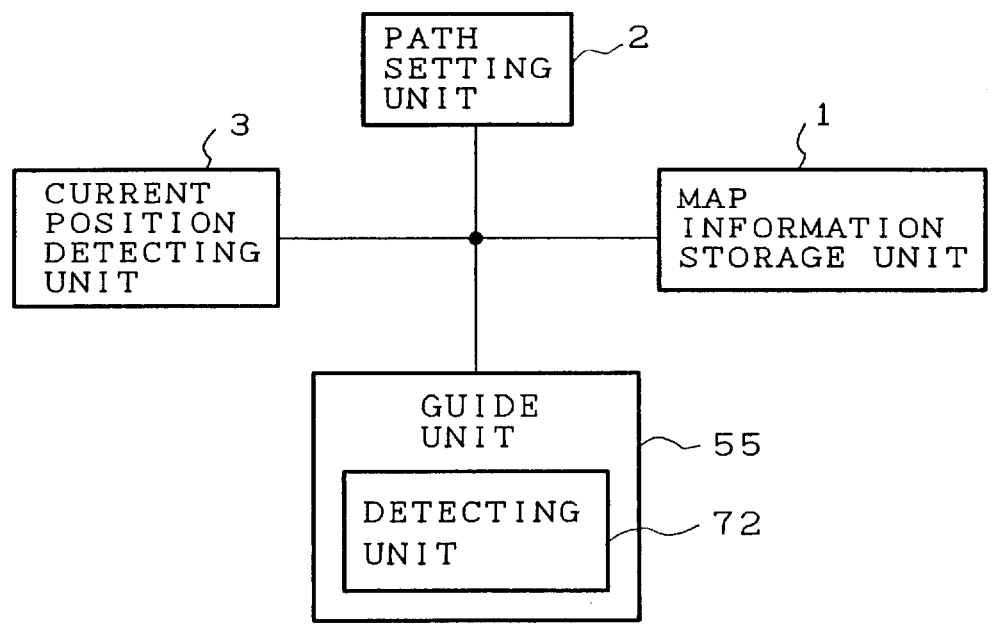
FIG. 30 is a block diagram showing a functional structure of a navigation apparatus according to the embodiment 9 of the present invention.

FIG. 30 is a block diagram showing a functional structure of a navigation apparatus according to the embodiment 9 of the present invention. The same reference numerals as those in FIG. 26 are used for component parts equivalent to those in embodiment 8, and descriptions thereof are omitted. In the drawing, reference numeral 72 means a detecting unit disposed in a guide unit 55 to detect an intersection located at a distance within a specified value (of, for example, 300 m) from a guide target intersection $C_1$ from among intersections except the guide target intersection $C_1$, located on a path between the guide target intersection $C_1$ and a current position of a mobile unit. The guide unit 55 differs from a guide unit 55 of the embodiment 8 shown in FIG. 26 in that the former includes the detecting unit 72, and displays the intersection detected by the detecting unit 72 together with the guide target intersection $C_1$.

Figure 31:
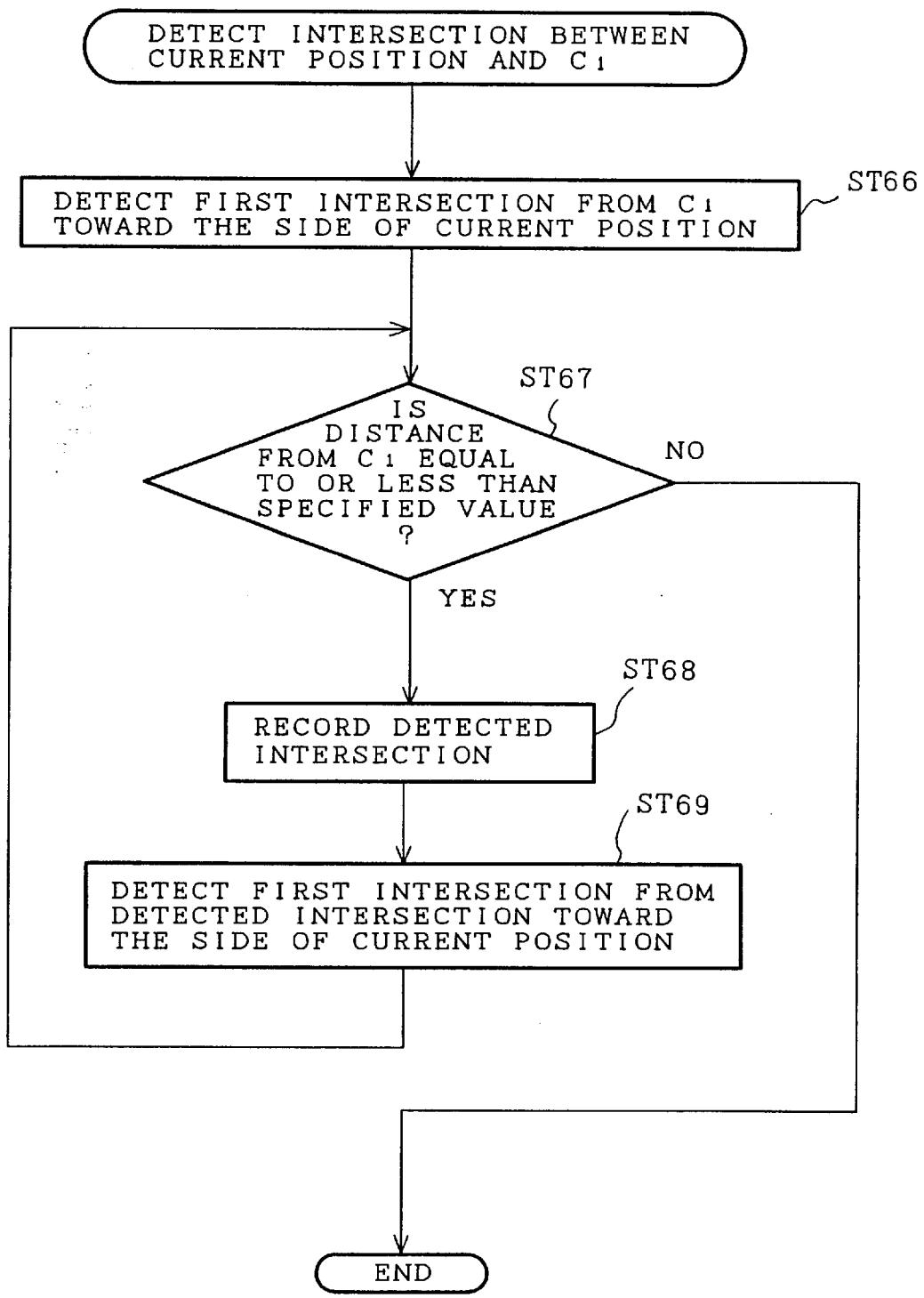
FIG. 31 is a flowchart showing an essential part of a flow of processing in the embodiment 9 of the present invention.

FIG. 31 is a flowchart of a flow of processing in the navigation apparatus according to the embodiment 9, showing only an essential part thereof. In the drawing, reference numerals ST66 to ST69 mean steps showing the units of processing.

Figure 32:
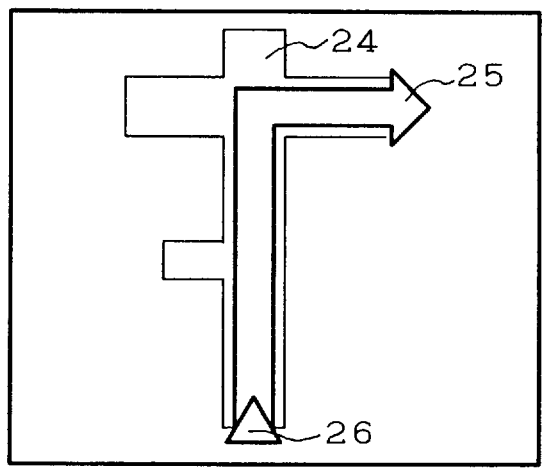
FIG. 32 is an explanatory view showing one illustrative intersection information map displayed in the embodiment 9 of the present invention.
Figure 33:
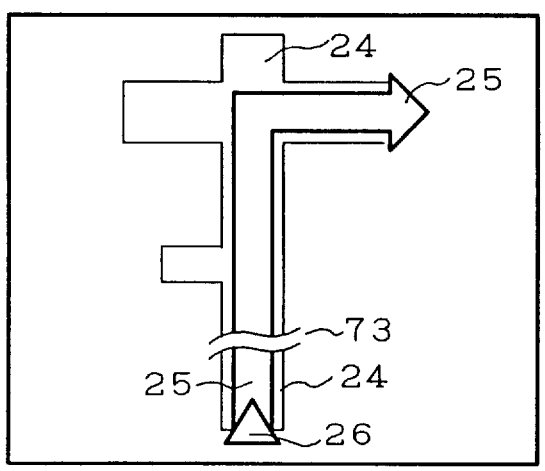
FIG. 33 is an explanatory view showing another illustrative intersection information map displayed in the embodiment 9 of the present invention.

FIGS. 32 and 33 are explanatory views showing illustrative intersection information maps displayed by the guide unit 55. In the drawing, reference numeral 24 means a shape of a road connected to the guide target intersection and the intersection except the guide target intersection, 25 is a direction of travel from the guide target intersection, 26 is a position of the mobile unit, and 73 is an omission mark showing the presence of an omitted intersection.

A description will now be given of the operation. The processing shown in the flowchart of FIG. 31 is equivalent to step ST63 in the processing in the embodiment 8 shown in the flowchart of FIG. 28. When the guide target intersection $C_1$ is detected in step ST62 of FIG. 28, the detecting unit 72 detects the first intersection from the detected guide target intersection $C_1$ toward the side of the current position of the mobile unit in step ST66. In step ST67, it is decided whether or not a distance between the intersection and the guide target intersections $C_1$ is less than a specified value (of, for example, 300 m). As a result, if less than the specified value, the operation proceeds to step ST68 to record that the detected intersection should be displayed on the intersection information map, thereafter proceeding to step ST69 to detect the first intersection from the detected intersection toward the side of the current position, and returning to step ST67. In subsequent steps, the series of processing is repeated until an intersection spaced the specified value or more apart from the guide target intersection $C_1$ is detected in step ST67.

The guide unit 55 can display, together with the guide target intersection $C_1$ on the intersection information map, only the intersection detected by the detecting unit 72 in such a manner and located at the distance within the specified value from the guide target intersection $C_1$. Thus, as shown in FIG. 32, it is possible to display only confusing intersections in the vicinity of the guide target intersection $C_1$. Therefore, it is possible to represent a relationship between the current position and the guide target intersection $C_1$ while the guide target intersection $C_1$ can easily being identified.

Alternatively, as shown in the illustrative intersection information map of FIG. 33, the omission mark 73 showing the presence of an omitted intersection may be used at a position at which the intersection is omitted.

As set forth above, according to the embodiment 9, concurrently with the closest right-turning/left-turning guide target intersection $C_1$, only the intersections in the vicinity of the guide target intersection $C_1$ can be displayed. As a result, there is an effect in that it is possible to more intelligibly inform a driver of the position of the guide target intersection $C_1$.

Embodiment 10

Figure 34:
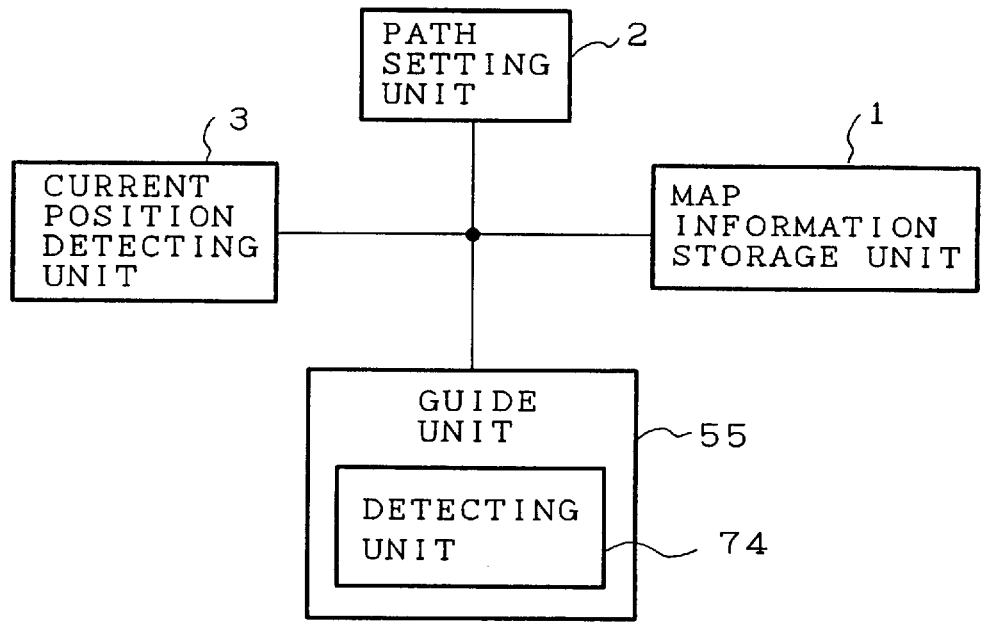
FIG. 34 is a block diagram showing a functional structure of a navigation apparatus according to the embodiment 10 of the present invention.

FIG. 34 is a block diagram showing a functional structure of a navigation apparatus according to the embodiment 10 of the present invention. The same reference numerals as those in FIG. 26 are used for component parts equivalent to those in embodiment 8, and descriptions thereof are omitted. In the drawing, reference numeral 74 means a detecting unit disposed in a guide unit 55 to detect intersections of which a driver can be conscious from among intersections except a guide target intersection $C_1$, located on a path from the guide target intersection $C_1$ to a current position of a mobile unit. The guide unit 55 differs from a guide unit 55 of the embodiment 8 shown in FIG. 26 in that the former includes the detecting unit 74, and displays the intersections detected by the detecting unit 74 together with the guide target intersection $C_1$.

Figure 35:
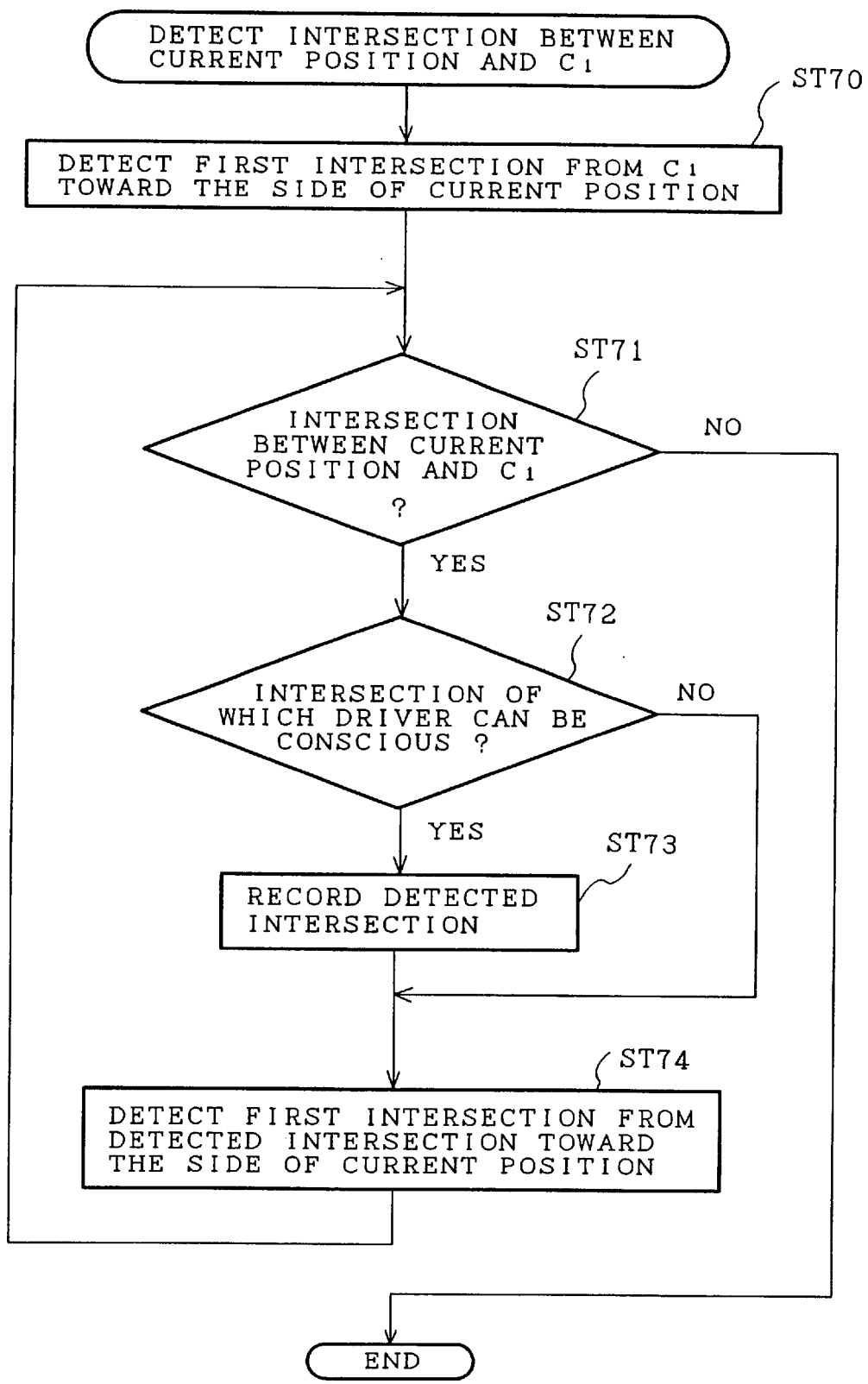
FIG. 35 is a flowchart showing an essential part of a flow of processing in the embodiment 10 of the present invention.

FIG. 35 is a flowchart of a flow of processing in the navigation apparatus according to the embodiment 10, showing only an essential part thereof. In the drawing, reference numerals ST70 to ST74 mean steps showing the units of processing.

Figure 36:
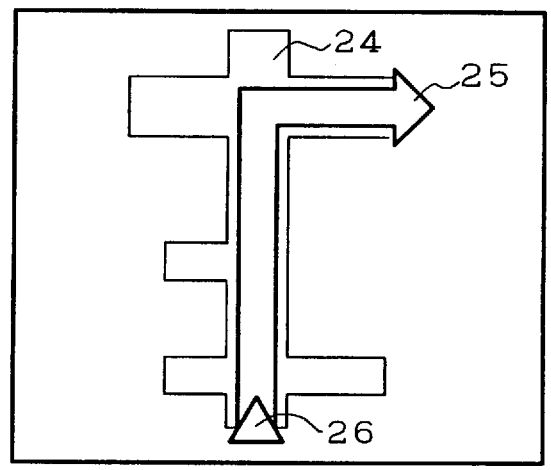
FIG. 36 is an explanatory view showing one illustrative intersection information map displayed in the embodiment 10 of the present invention.

FIG. 36 is an explanatory view showing one illustrative intersection information map displayed by the guide unit 55. In the drawing, reference numeral 24 means a shape of a road connected to the guide target intersection and the intersection except the guide target intersection, 25 is a direction of travel from the guide target intersection, and 26 is the position of the mobile unit.

A description will now be given of the operation. The processing shown in the flowchart of FIG. 35 is equivalent to step ST63 in the processing in the embodiment 8 shown in the flowchart of FIG. 28. When the guide target intersection $C_1$ is detected in step ST62 of FIG. 28, the detecting unit 74 detects the first intersection from the detected guide target intersection $C_1$ toward the side of the current position of the mobile unit in step ST70. In step ST71, it is decided whether or not the detected intersection is located between the guide target intersections $C_1$ and the current position of the mobile unit. As a result, if the intersection is located therebetween, the operation proceeds to step ST72 to decide whether or not the detected intersection is the intersection of which the driver can be conscious. As used herein "the intersection of which the driver can be conscious" means an intersection such as confluence or an intersection having only a road connected to an opposite lane except points which the driver can not regard as an intersection. If the intersection of which the driver can be conscious as a result of decision in step ST72, the operation branches to step ST73 to record that the detected intersection should be displayed on the intersection information map. Thereafter, the operation proceeds to step ST74 to detect the first intersection from the detected intersection toward the side of the current position. On the other hand, if not the intersection of which the driver can be conscious, the operation directly branches to step ST74, thereafter returning to step ST71 to repeat the series of processing with respect to all the intersections located between the guide target intersection $C_1$ and the current position of the mobile unit.

As shown in FIG. 36, the guide unit 55 can display, together with the guide target intersection $C_1$ on the intersection information map, only the intersection detected by the detecting unit 72 in such a manner, of which the driver can be conscious between the guide target intersection and the current position. However, the guide unit 55 does not display intersections such as confluence of which the driver can not be conscious. It is thereby possible to more intelligibly display the intersection.

As set forth above, according to the embodiment 10, it is possible to display only the intersections of which the driver can be conscious between the closest right-turning/left-turning guide target intersection $C_1$ and the current position of the mobile unit together with the guide target intersection $C_1$. As a result, there is an effect in that it is possible to more intelligibly inform the driver of the guide target intersection $C_1$.

Embodiment 11

Figure 37:
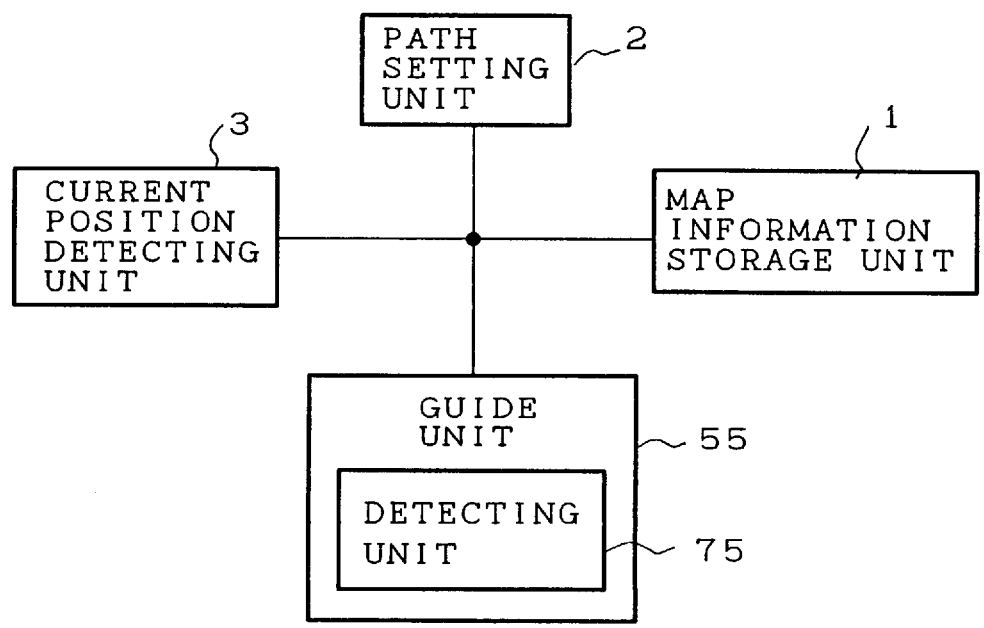
FIG. 37 is a block diagram showing a functional structure of a navigation apparatus according to the embodiment 11 of the present invention.

FIG. 37 is a block diagram showing a functional structure of a navigation apparatus according to the embodiment 11 of the present invention. The same reference numerals as those in FIG. 26 are used for component parts equivalent to those in embodiment 8, and descriptions thereof are omitted. In the drawing, reference numeral 75 means a detecting unit disposed in a guide unit 55 to detect only a distinctive intersection from among intersections except a guide target intersection $C_1$, located on a path from the guide target intersection $C_1$ to a current position of a mobile unit. The guide unit 55 differs from a guide unit 55 of the embodiment 8 shown in FIG. 26 in that the former includes the detecting unit 75, and displays the intersection detected by the detecting unit 75 together with the guide target intersection $C_1$.

Figure 38:
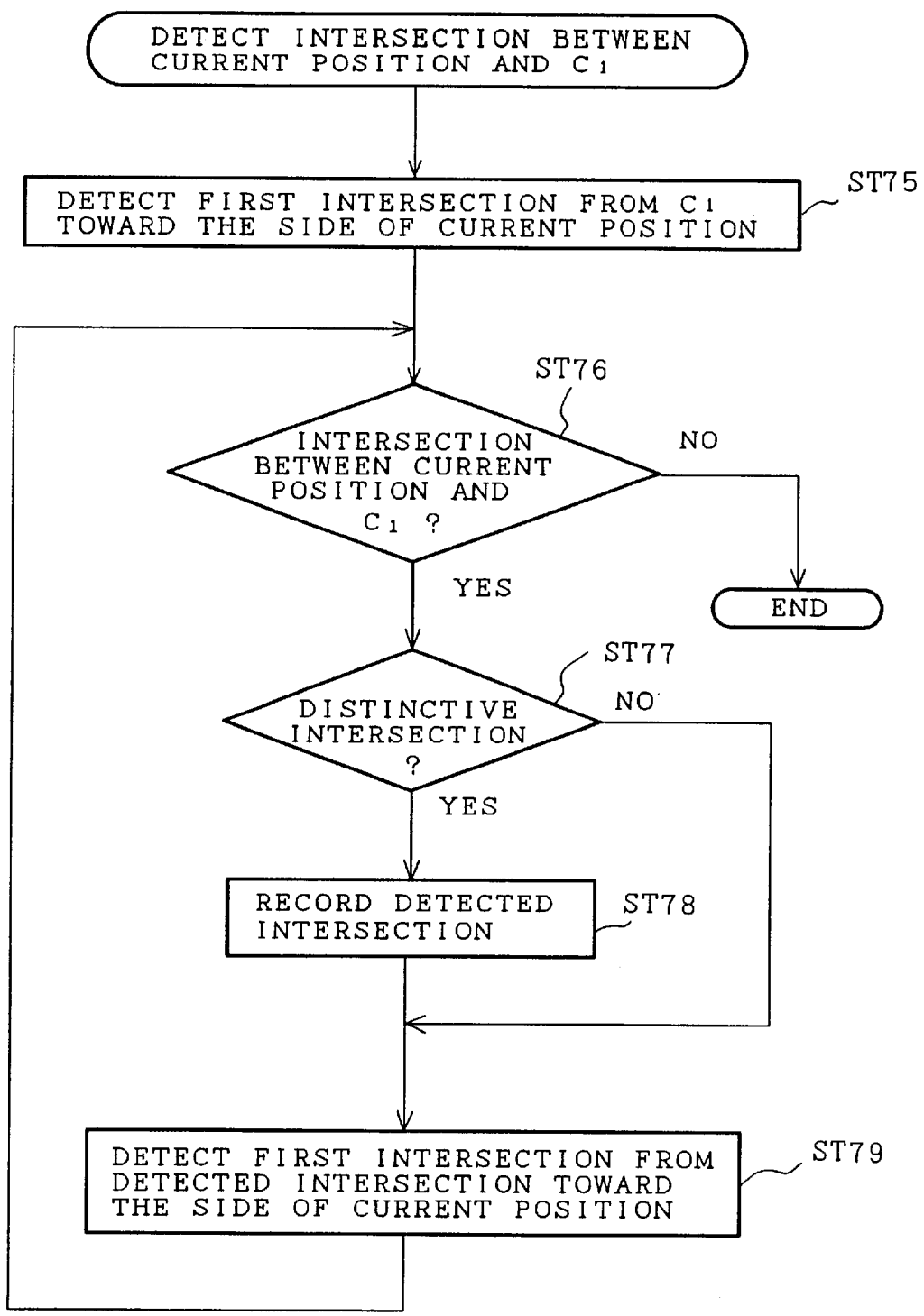
FIG. 38 is a flowchart showing an essential part of a flow of processing in the embodiment 11 of the present invention.

FIG. 38 is a flowchart of a flow of processing in the navigation apparatus according to the embodiment 11, showing only an essential part thereof. In the drawing, reference numerals ST75 to ST79 mean steps showing the units of processing.

Figure 39:
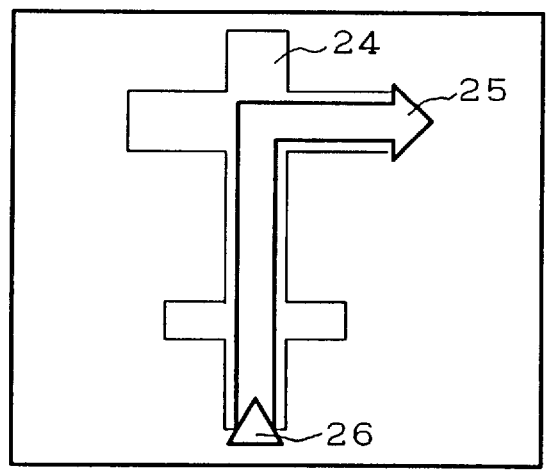
FIG. 39 is an explanatory view showing one illustrative intersection information map displayed in the embodiment 11 of the present invention.
Figure 40:
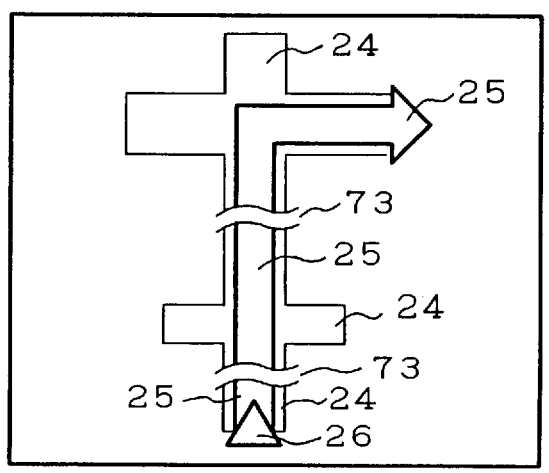
FIG. 40 is an explanatory view showing another illustrative intersection information map displayed in the embodiment 11 of the present invention.

FIGS. 39 and 40 are explanatory views showing illustrative intersection information maps displayed by the guide unit 55. In the drawing, reference numeral 24 means a shape of a road connected to the guide target intersection and the intersection except the guide target intersection, 25 is a direction of travel from the guide target intersection, 26 is the position of the mobile unit, and 73 is an omission mark showing the presence of an omitted intersection.

A description will now be given of the operation. The processing shown in the flowchart of FIG. 38 is equivalent to step ST63 in the processing in the embodiment 8 shown in the flowchart of FIG. 28. When the guide target intersection $C_1$ is detected in step ST62 of FIG. 28, the detecting unit 75 detects the first intersection from the guide target intersection $C_1$ toward the side of the current position in step ST75. In step ST76, it is decided whether or not the intersection is located between the guide target intersections $C_1$ and the current position. As a result, if the intersection is located therebetween, the operation proceeds to step ST77 to decide whether or not the detected intersection is the distinctive intersection. As used herein "the distinctive intersection" means a distinctive intersection such as intersection connected to, for example, a national road. If the distinctive intersection as a result of decision in step ST77, the operation branches to step ST78 to record that the detected intersection should be displayed on the intersection information map. Thereafter, the operation proceeds to step ST79 to detect the first intersection from the detected intersection toward the side of the current position. On the other hand, if not the distinctive intersection, the operation directly branches to step ST79, thereafter returning to step ST76 to repeat the series of processing with respect to all the intersections located between the guide target intersection $C_1$ and the current position.

The guide unit 55 can display, together with the guide target intersection $C_1$ on the intersection information map, only the distinctive intersection detected by the detecting unit 75 in such a manner. It is thereby possible to represent only the distinctive intersection such as intersection connected to the national road, between the guide target intersection $C_1$ and the current position as shown in FIG. 39.

Alternatively, as shown in the illustrative intersection information map of FIG. 40, the omission mark 73 showing the presence of an omitted intersection may be used at a position at which the intersection is omitted.

As set forth above, according to the embodiment 11, it is possible to display the distinctive intersection located between the closest right-turning/left-turning guide target intersection $C_1$ and the current position of the mobile unit together with the guide target intersection $C_1$. As a result, there is an effect in that it is possible to more intelligibly inform the driver of the guide target intersection $C_1$.

Embodiment 12

Figure 41:
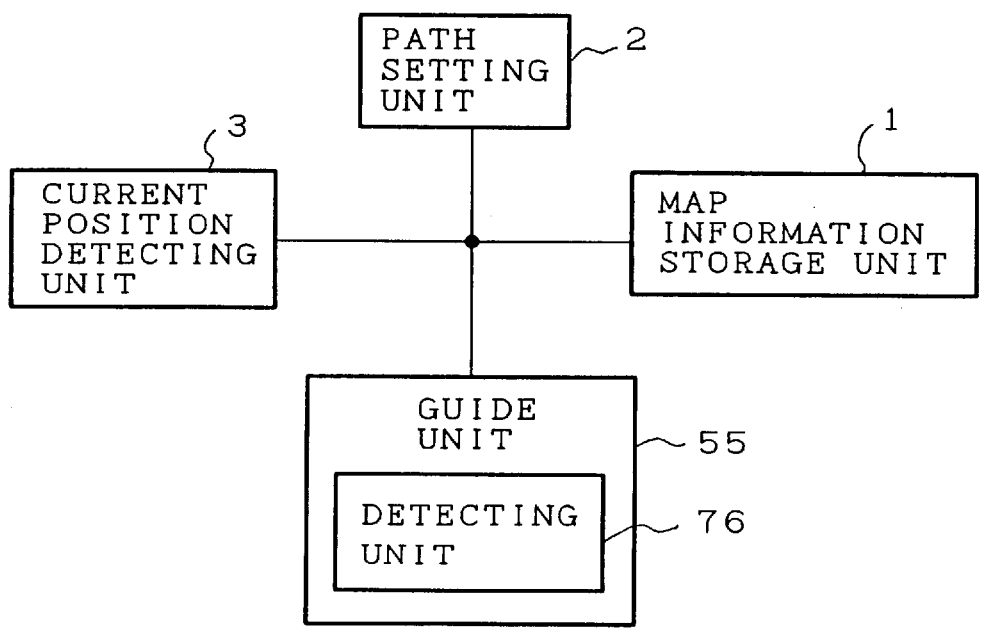
FIG. 41 is a block diagram showing a functional structure of a navigation apparatus according to the embodiment 12 of the present invention.

FIG. 41 is a block diagram showing a functional structure of a navigation apparatus according to the embodiment 12 of the present invention. The same reference numerals as those in FIG. 26 are used for component parts equivalent to those in embodiment 8, and descriptions thereof are omitted. In the drawing, reference numeral 76 means a detecting unit disposed in a guide unit 55 to detect only a distinctive intersection from among intersections except a guide target intersection $C_1$, located on a path between the guide target intersection $C_1$ and a current position of a mobile unit. The detecting unit 76 differs from a detecting unit 75 of the embodiment 11 shown in FIG. 37 in that the former limits the number of detected distinctive intersections to a specified value (of, for example, 3).

Figure 42:
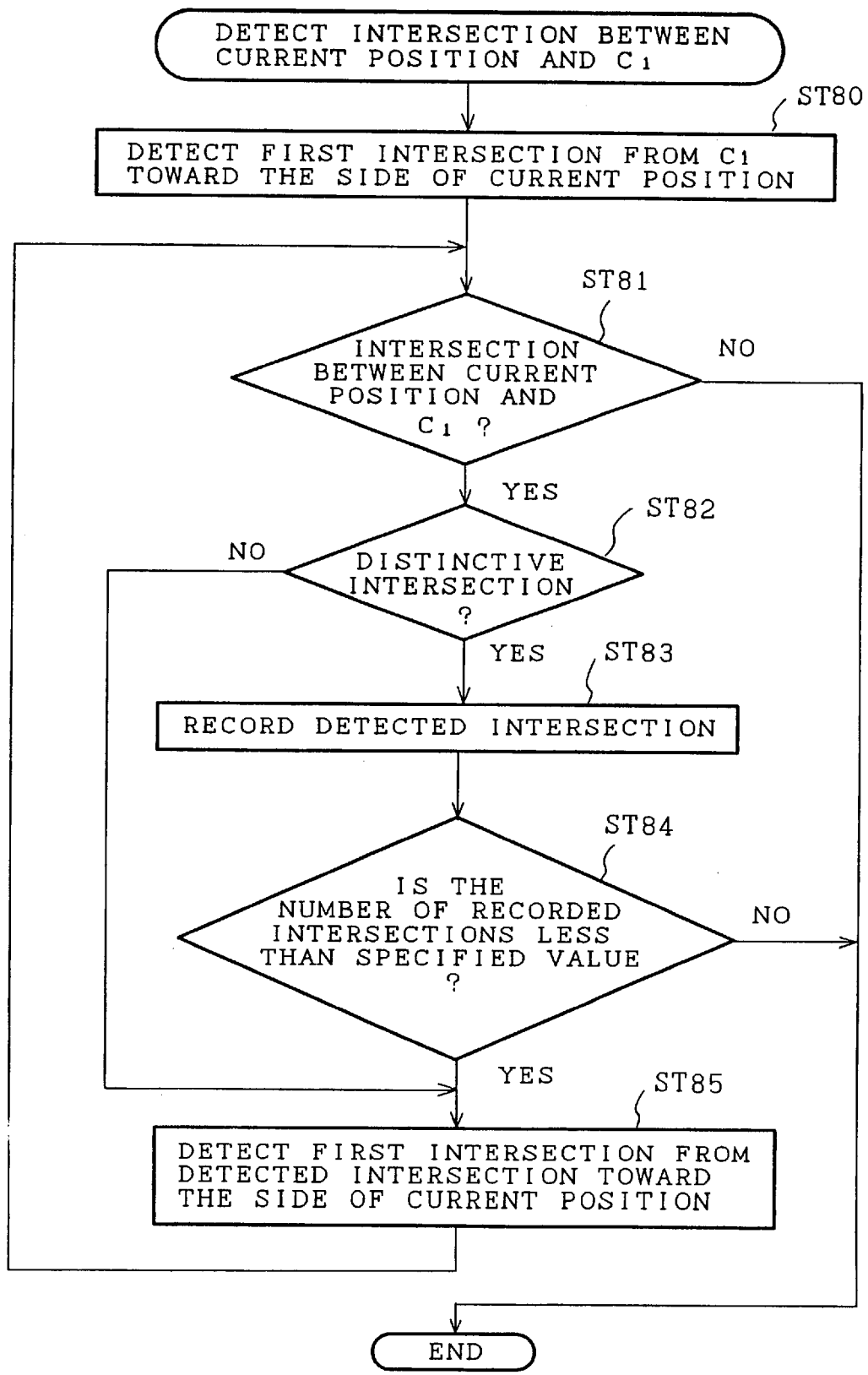
FIG. 42 is a flowchart showing an essential part of a flow of processing in the embodiment 12 of the present invention.

FIG. 42 is a flowchart of a flow of processing in the navigation apparatus according to the embodiment 12, showing only an essential part thereof. In the drawing, reference numerals ST80 to ST85 mean steps showing the units of processing.

A description will now be given of the operation. The processing shown in the flowchart of FIG. 42 is equivalent to step ST63 in the processing in the embodiment 8 shown in the flowchart of FIG. 28. When the guide target intersection $C_1$ is detected in step ST62 of FIG. 28, the detecting unit 76 detects the first intersection from the detected guide target intersection $C_1$ toward the side of the current position in step ST80. In step ST81, it is decided whether or not the detected intersection is located between the guide target intersections $C_1$ and the current position. If the intersection is located therebetween, the operation proceeds to step ST82 to decide whether or not the detected intersection is the distinctive intersection. If the distinctive intersection, the operation proceeds to step ST83 to record that the detected intersection should be displayed on an intersection information map. Subsequently, in step ST84, it is decided whether or not the number of recorded intersections exceeds the specified value (of, for example, 3). If less than the specified value as a result of decision, the operation branches to step ST85 to detect the first intersection from the detected intersection toward the side of the current position, thereafter returning to step ST81. In subsequent steps, the series of processing is repeated until an intersection not located between the guide target intersection $C_1$ and the current position is detected in step ST81, or it is decided in step ST84 that the number of recorded intersections is equal to or more than the specified value.

As described above, by limiting the number of displayed distinctive intersections between the guide target intersection $C_1$ and the current position, it is possible to display the distinctive intersections such as intersection connected to a national road in the order of proximity to the guide target intersection $C_1$ by the specified number.

As set forth above, according to the embodiment 12, it is possible to display the distinctive intersections such as intersection connected to the national road, located between the closest right-turning/left-turning guide target intersection $C_1$ and the current position by the specified number. As a result, there is an effect in that it is possible to display the guide target intersection $C_1$ more intelligibly to the driver.

Embodiment 13

In the navigation apparatus according to the embodiment 12, the distinctive intersections between the guide target intersection $C_1$ and the current position are displayed on the intersection information map in the order of proximity to the guide target intersection $C_1$ by the specified number (of, for example, 3). Instead thereof, in view of precedence of the distinctive intersection between the guide target intersection $C_1$ and the current position, the distinctive intersections may be displayed on the intersection information map in the order of decreasing precedence by the specified number.

Figure 43:
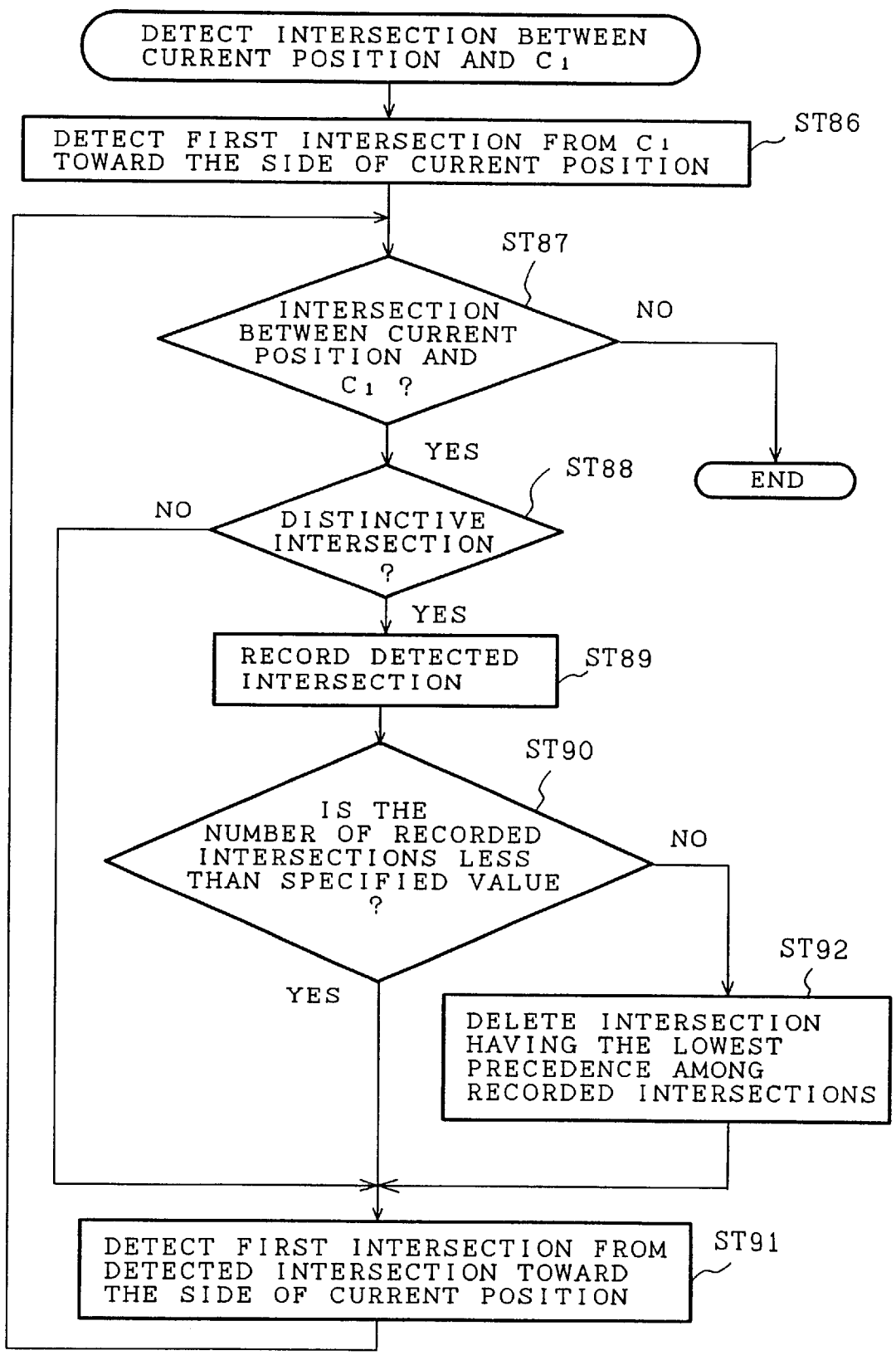
FIG. 43 is a flowchart showing an essential part of a flow of processing in a navigation apparatus according to the embodiment 13 of the present invention.

FIG. 43 is a flowchart of a flow of processing in a navigation apparatus according to the embodiment 13, showing only an essential part thereof. In the drawing, reference numerals ST86 to ST92 mean steps showing the units of processing.

FIG. 44 is an explanatory view showing a table in which priorities set according to shapes of intersections are recorded. In the drawing, reference numeral 77 means precedence showing priority of display of the intersection, and 78 is an illustrative intersection shape showing distinction of the intersection.

A description will now be given of the operation. The processing shown in the flowchart of FIG. 43 is equivalent to step ST63 in the processing in the embodiment 8 shown in the flowchart of FIG. 28. When the guide target intersection $C_1$ is detected in step ST62 of FIG. 28, as in the embodiment 12, a detecting unit 76 detects the first intersection from the detected guide target intersection $C_1$ toward the side of the current position in step ST86. In step ST87, it is decided whether or not the detected intersection is a distinctive intersection. If the distinctive intersection, it is recorded that the intersection should be displayed on an intersection information map in step ST89. Subsequently, in step ST90, it is decided whether or not the number of recorded intersections exceeds a specified value. If less than the specified value, the operation branches to step ST91 to detect the first intersection from the detected intersection toward the side of the current position as in the embodiment 12. On the other hand, if the number of recorded intersections is equal to or more than the specified value as a result of decision in step ST90, the operation branches to step ST92 to delete an intersection having the lowest precedence among the recorded intersections, thereafter proceeding to step ST91. In subsequent steps, the operation returns to step ST87 to repeat the series of processing until an intersection except the intersections located between the guide target intersection $C_1$ and the current position is detected.

As described above, by limiting the number of displayed distinctive intersections between the closest right-turning/left-turning guide target intersection and the current position, it is possible to display the distinctive intersections such as intersection connected to a national road between the guide target intersection and the current position in the order of decreasing precedence by the specified number.

As set forth above, according to the embodiment 13, it is possible to display the distinctive intersection between the closest right-turning/left-turning guide target intersection $C_1$ and the current position in the order of decreasing precedence by the limited number. As a result, there is an effect in that it is possible to more intelligibly inform the driver of the guide target intersection $C_1$.

Embodiment 14

FIG. 45 is a block diagram showing a functional structure of a navigation apparatus according to the embodiment 14 of the present invention. The same reference numerals as those in FIG. 26 are used for component parts equivalent to those in embodiment 8, and descriptions thereof are omitted. In the drawing, reference numeral 79 means a control unit disposed in a guide unit 55 to change types of objects such as road, intersection, intersection name, facilities mark, and route number displayed on an intersection information map by the guide unit 55 according to the number of intersections displayed on the intersection information map. The guide unit 55 differs from a guide unit of the embodiment 8 shown in FIG. 26 in that the former includes the control unit 79.

Figures 46, 47:
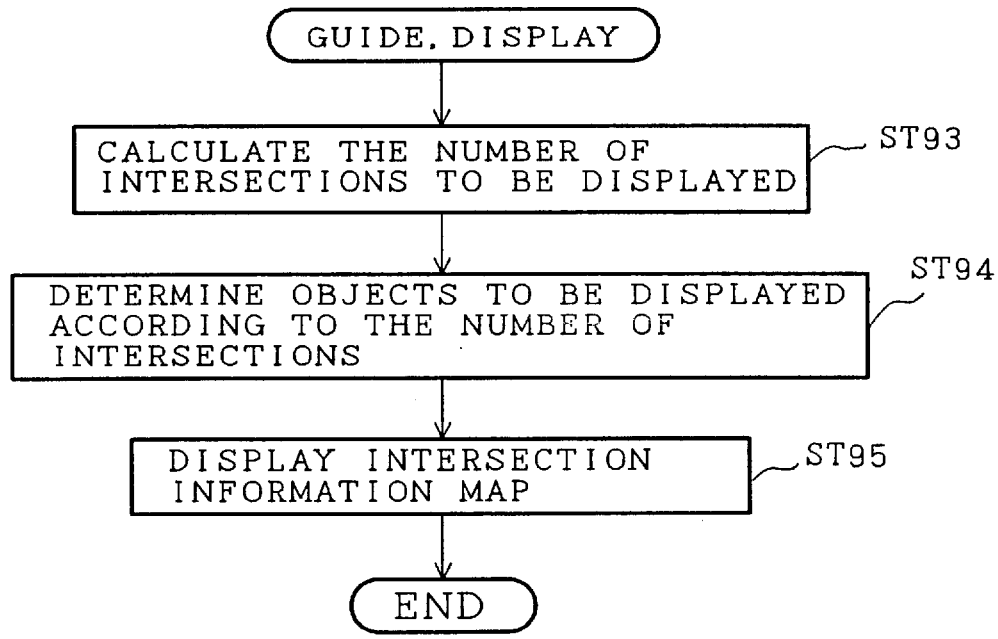
FIG. 46 is a flowchart showing an essential part of a flow of processing in the embodiment 14 of the present invention.
FIG. 47 is an explanatory view showing one illustrative table showing types of objects displayed according to the number of intersections in the embodiment 14 of the present invention.

FIG. 46 is a flowchart of a flow of processing in a navigation apparatus according to the embodiment 14, showing only an essential part thereof. In the drawing, reference numerals ST93 to ST95 mean steps showing the units of processing.

FIG. 47 is an explanatory view showing one illustrative table used when the control unit 79 determines the objects displayed on the intersection information map according to the number of intersections. In the drawing, reference numeral 80 means the number of displayed intersections and 81 is illustrative displayed objects.

Figure 48:
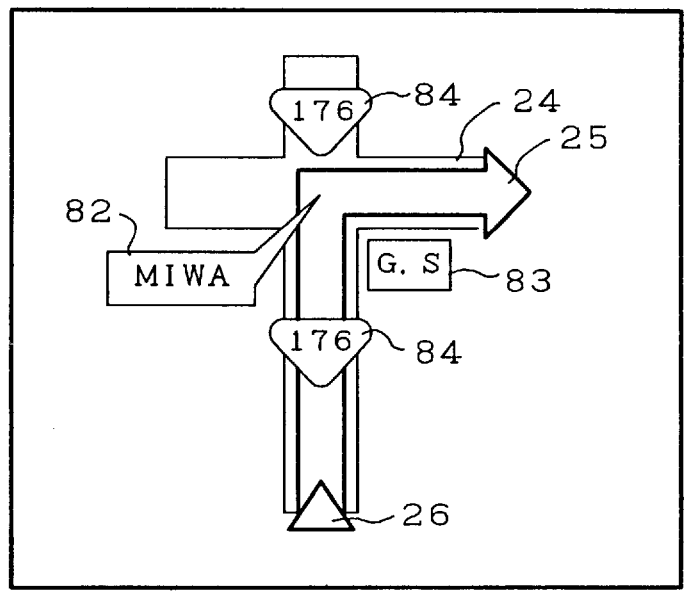
FIG. 48 is an explanatory view showing one illustrative intersection information map displayed in the embodiment 14 of the present invention.
Figure 49:
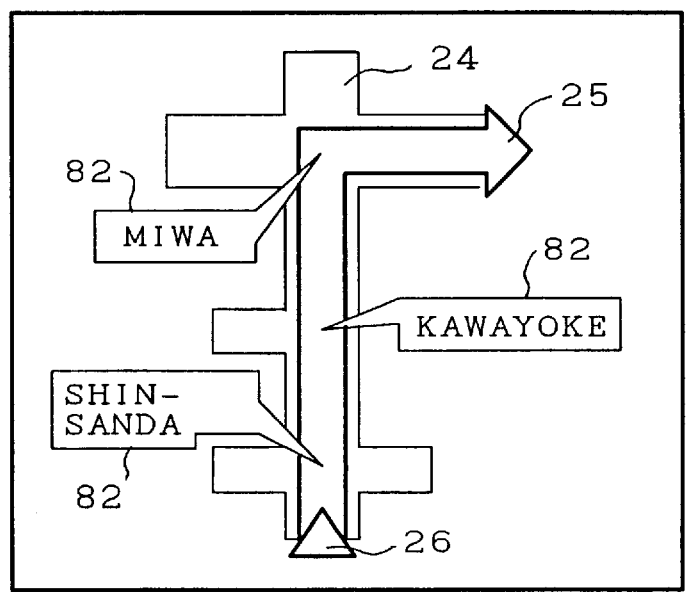
FIG. 49 is an explanatory view showing another illustrative intersection information map displayed in the embodiment 14 of the present invention.
Figure 50:
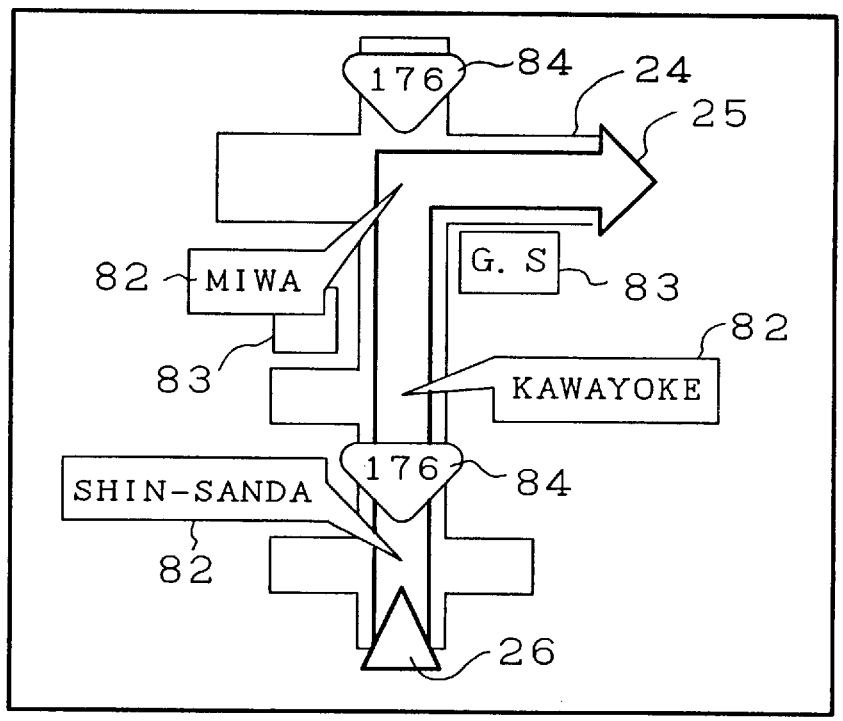
FIG. 50 is an explanatory view showing one illustrative intersection information map in which all objects are displayed in the embodiment 14 of the present invention.

FIGS. 48 to 50 are explanatory views showing illustrative intersection information maps displayed by the guide unit 55. In the drawing, reference numeral 24 means a shape of a road connected a guide target intersection and an intersection except the guide target intersection, 25 is a direction of travel from the guide target intersection, and 26 is a position of a mobile unit. Further, reference numeral 82 means an intersection name for representing a name of an intersection by a method such as balloon, 83 is a facilities mark for representing facilities in the vicinity of the intersection, and 84 is a route number of the road.

A description will now be given of the operation. The processing shown in the flowchart of FIG. 46 is equivalent to step ST64 in the processing in the embodiment 8 shown in the flowchart of FIG. 28. When all intersections are detected between the current position of the mobile unit and the closest right-turning/left-turning guide target intersection $C_1$ in step ST63 of FIG. 28, the control unit 79 calculates the number of intersections to be concurrently displayed on the intersection information map in step ST93. Subsequently, the operation proceeds to step ST94 to refer to the table shown in FIG. 47 so as to determine the types of the objects to be displayed according to the number of intersections calculated in step ST93. Thereafter, in step ST95, the guide unit 55 displays the intersection information map including the objects determined by the control unit 79.

Therefore, when the number of intersections is one, the objects to be displayed include the road, the intersection, the intersection name, the facilities name, and the route number according to the table shown in FIG. 47. Thus, as shown in FIG. 48, on the intersection information map are displayed the intersection name 82, the facilities mark 83 in the vicinity of the intersection, and the route number 84 concurrently with the shape 24 of the road connected to the intersection, the direction 25 of travel from the guide target intersection, and the position 26 of the mobile unit. On the other hand, when the number of intersections is three, the objects to be displayed include only the road, the intersection, and the intersection name according to the table shown in FIG. 47. Thus, as shown in FIG. 49, on the intersection information map is displayed only the intersection name 82 concurrently with the shape 24 of the road connected to the intersection, the direction 25 of travel from the guide target intersection, and the position 26 of the mobile unit.

As described above, the types of the objects displayed on the intersection information map are limited according to the number of displayed intersections. In case of a small number of intersections, it is thereby possible to increase the types of the objects to be displayed as shown in FIG. 48 so as to provide more information to a driver. In case of a large number of intersections, it is possible to reduce the types of the objects to be displayed as shown in FIG. 49 so as to prevent complication of the intersection information map due to the excessive number of objects as shown in FIG. 50. Consequently, it is possible to provide the intersection information map which the driver can easily read in any case.

In the above discussion, the present invention is applied to the navigation apparatus according to the embodiment 8. However, it must be noted that the present invention may be applied to the navigation apparatus according to the embodiment 1. In this case, the guide unit 4 shown in FIG. 1 has the control unit 79, and the processing shown in the flowchart of FIG. 46 is equivalent to step ST18 or ST20 shown in the flowchart of FIG. 5.

As set forth above, according to the embodiment 14, it is possible to determine the types of the objects to be displayed according to the number of intersections displayed on the intersection information map. As a result, there are effects in that it is possible to prevent the complication of the intersection information map due to an excessive amount of information when the large number of intersections are displayed, and provide more information for the driver in case of the small number of intersections.

Embodiment 15

Figure 51:
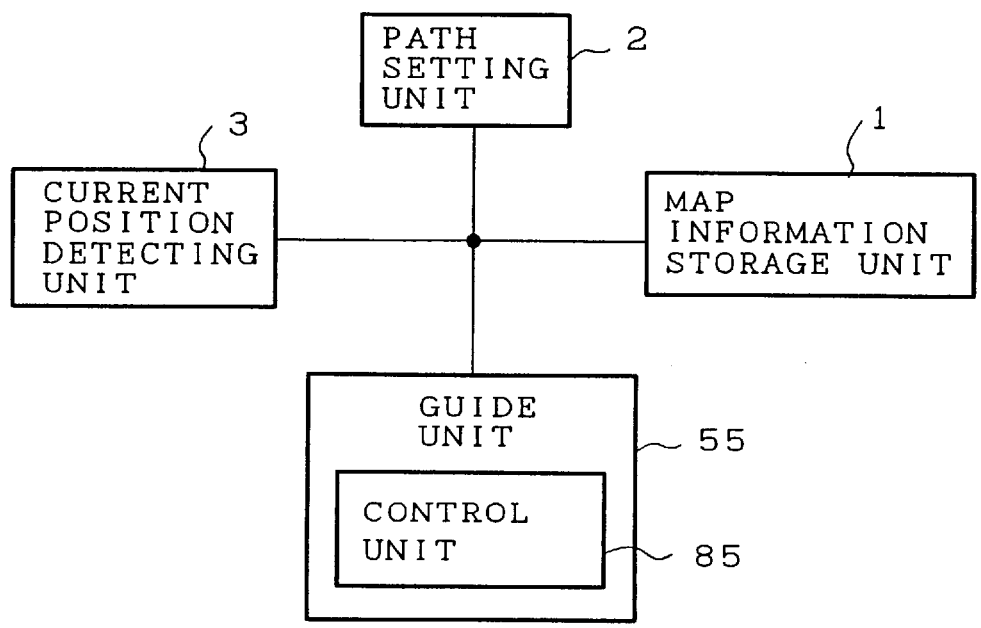
FIG. 51 is a block diagram showing a functional structure of a navigation apparatus according to the embodiment 15 of the present invention.

FIG. 51 is a block diagram showing a functional structure of a navigation apparatus according to the embodiment 15 of the present invention. The same reference numerals as those in FIG. 26 are used for component parts equivalent to those in embodiment 8, and descriptions thereof are omitted. In the drawing, reference numeral 85 means a control unit disposed in a guide unit 55 to control such that the total number of objects such as road, intersection, intersection name, facilities mark, and route number displayed on an intersection information map by the guide unit 55 becomes equal to or less than a specified value (of, for example 20) which is predetermined. The guide unit 55 differs from a guide unit of the embodiment 8 shown in FIG. 26 in that the former includes the control unit 85.

FIG. 52 is a flowchart of a flow of processing in the navigation apparatus according to the embodiment 15, showing only an essential part thereof. In the drawing, reference numerals ST96 to ST99 mean steps showing the units of processing.

FIG. 53 is an explanatory view showing one illustrative table used when the control unit 85 displays on the intersection information map the objects by the number equal to or less than the specified value. In the drawing, reference numeral 86 means precedence of display on the intersection information map, and 87 is illustrative types of the objects to which the precedence is given.

A description will now be given of the operation. The processing shown in the flowchart of FIG. 52 is equivalent to step ST64 in the processing in the embodiment 8 shown in the flowchart of FIG. 28. When intersections are detected between a current position of a mobile unit and the closest right-turning/left-turning guide target intersection $C_1$ in step ST63 of FIG. 28, the control unit 85 calculates the number of objects to be displayed on the intersection information map in step ST96. Subsequently, the operation proceeds to step ST97 to decide whether or not the number of objects is equal to or less than the specified value (of, for example, 20). If the number of objects exceeds the specified value as a result of decision, the operation proceeds to step ST98 to refer to the table shown in FIG. 53 so as to remove an object (for example, the route number) having the lowest precedence from a group of the displayed objects. Thereafter, the operation returns to step ST96 to repeat the above processing until it is detected in step ST97 that the total number of objects becomes equal to or less than the specified value. When it is detected in step ST97 that the total number of objects becomes equal to or less than the specified value, the guide unit 55 displays the intersection information map including the objects determined by the control unit 85 in step ST99.

As described above, the total number of objects displayed on the intersection information map is limited. In case of an intersection information map about the plurality of intersections, no object having lower precedence is displayed. It is thereby possible to prevent complication of the intersection information map due to the excessive number of displayed objects so as to provide the intersection information map which a driver can easily read. In case of an intersection information map about one intersection, it is possible to additionally display the objects having lower precedence so as to provide more information for the driver.

In the above discussion, the present invention is applied to the navigation apparatus according to the embodiment 8. However, it must be noted that the present invention may be applied to the navigation apparatus according to the embodiment 1. In this case, the guide unit 4 shown in FIG. 1 has the control unit 85, and the processing shown in the flowchart of FIG. 52 is equivalent to steps ST18 and ST20 shown in the flowchart of FIG. 5.

As set forth above, according to the embodiment 15, it is possible to limit the total number of objects displayed on the intersection information map to the specified value or less. As a result, there are effects in that it is possible to prevent the complication of the intersection information map due to an excessive amount of information when the large number of intersections are displayed, and provide more information for the driver in case of the small number of intersections.

Embodiment 16

Figure 54:
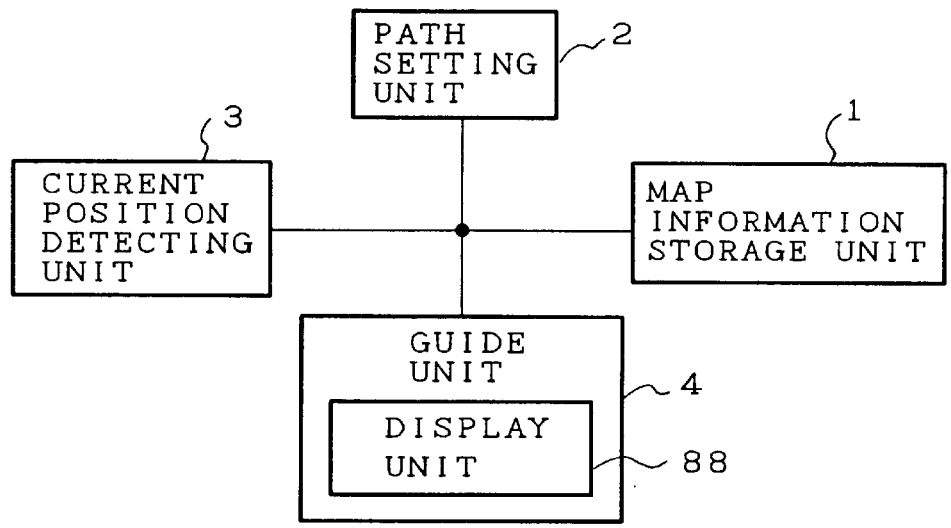
FIG. 54 is a block diagram showing a functional structure of a navigation apparatus according to the embodiment 16 of the present invention.

FIG. 54 is a block diagram showing a functional structure of a navigation apparatus according to the embodiment 16 of the present invention. The same reference numerals as those in FIG. 1 are used for component parts equivalent to those in embodiment 1, and descriptions thereof are omitted. In the drawing, reference numeral 88 means a display unit disposed in a guide unit 4 to display a guide target intersection on an intersection information map shown by the guide unit 4 with a mark showing that it is the guide target intersection. The guide unit 4 differs from a guide unit of the embodiment 1 shown in FIG. 1 in that the former includes the display unit 88.

Figure 55:
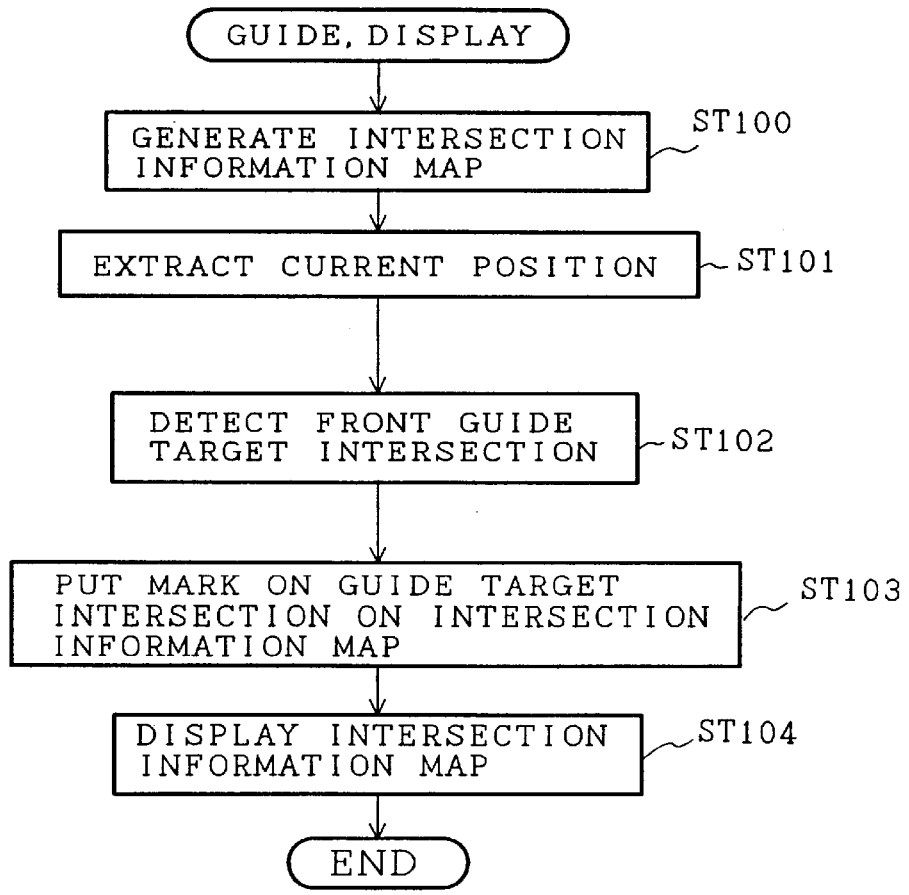
FIG. 55 is a flowchart showing an essential part of a flow of processing in the embodiment 16 of the present invention.

FIG. 55 is a flowchart of a flow of processing in a navigation apparatus according to the embodiment 16, showing only an essential part thereof. In the drawing, reference numerals ST100 to ST104 mean steps showing the units of processing.

Figure 56:
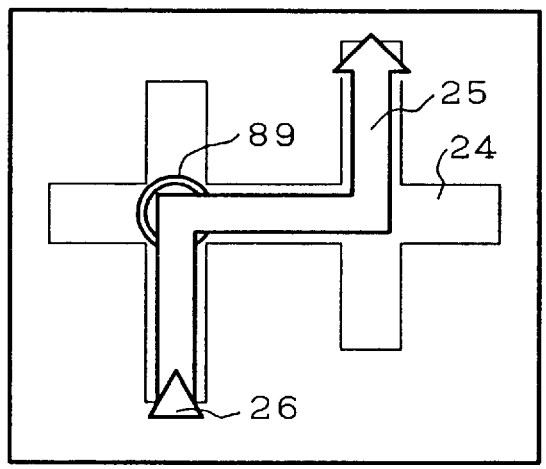
FIG. 56 is an explanatory view showing one illustrative intersection information map displayed in the embodiment 16 of the present invention.
Figure 57:
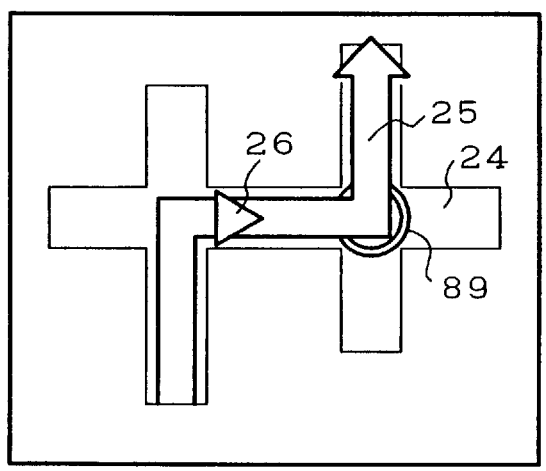
FIG. 57 is an explanatory view showing another illustrative intersection information map displayed in the embodiment 16 of the present invention.

FIGS. 56 and 57 are explanatory views showing illustrative intersection information maps displayed by the guide unit 4. In the drawing, reference numeral 24 means a shape of a road connected to the guide target intersection, 25 is a direction of travel from the guide target intersection, and 26 is a position of a mobile unit. Further, reference numeral 89 means a mark showing that the intersection is the guide target intersection in front of the mobile unit.

A description will now be given of the operation. The processing shown in the flowchart of FIG. 55 is equivalent to step ST18 or ST20 in the processing in the embodiment 1 shown in the flowchart of FIG. 5. In step ST100, the display unit 88 generates an intersection information map including the closest right-turning/left-turning guide target intersection $C_1$ and the next guide target intersection $C_2$. Subsequently, the operation proceeds to step ST101 to extract a current position of the mobile unit detected by a current position detecting unit 3, thereafter proceeding to step ST102 to detect the closest right-turning/left-turning guide target intersection $C_1$ in front of the current position. Next, in step ST103, the mark showing that the intersection is the guide target intersection is put on the intersection displayed on the intersection information map. Further, in step ST104, the intersection information map is displayed in which the mark is put on the guide target intersection $C_1$.

Thus, as shown in FIG. 56, the mark 89 showing that the intersection is the guide target intersection is displayed on the intersection information map at the guide target intersection $C_1$ in front of the current position 26 of the mobile unit. Hence, it is possible to provide the intersection information map on which the guide target intersection can easily be identified even when the plurality of intersections are displayed. Further, when the mobile unit is moved to move the current position 26 of the mobile unit as shown in FIG. 57, the mark 89 showing the guide target intersection is moved to and displayed at the next guide target intersection $C_2$ in front of the current position 26.

In the above discussion, the present invention is applied to the navigation apparatus according to the embodiment 1. However, it must be noted that the present invention may be applied to the navigation apparatus according to the embodiment 8. In this case, the guide unit 55 shown in FIG. 26 has the display unit 88, and the processing shown in the flowchart of FIG. 55 is equivalent to step ST64 shown in the flowchart of FIG. 28.

As set forth above, according to the embodiment 16, it is possible to additionally display the mark 89 showing the guide target intersection at the guide target intersection in front of the current position of the mobile unit when the plurality of intersections are displayed on the intersection information map. As a result, there is an effect in that it is possible to more intelligibly inform a driver of the guide target intersection.

Embodiment 17

Figure 58:
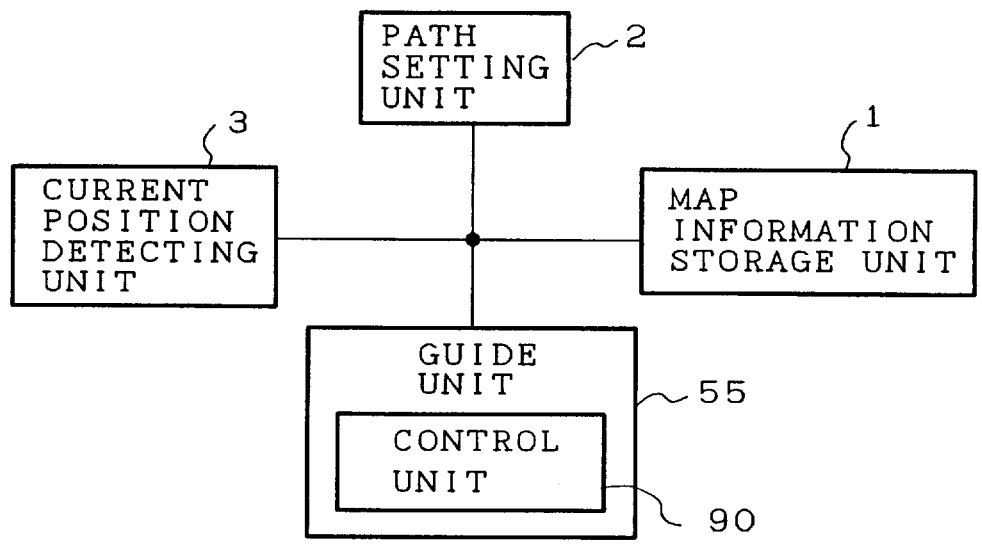
FIG. 58 is a block diagram showing a functional structure of a navigation apparatus according to the embodiment 17 of the present invention.

FIG. 58 is a block diagram showing a functional structure of a navigation apparatus according to the embodiment 17 of the present invention. The same reference numerals as those in FIG. 26 are used for component parts equivalent to those in embodiment 8, and descriptions thereof are omitted. In the drawing, reference numeral 90 means a control unit disposed in a guide unit 55 to control such that an intersection information map can be accommodated in a display screen by changing a scale of the intersection information map displayed by the guide unit 55. The guide unit 55 differs from a guide unit of the embodiment 8 shown in FIG. 26 in that the former includes the control unit 90.

Figure 59:
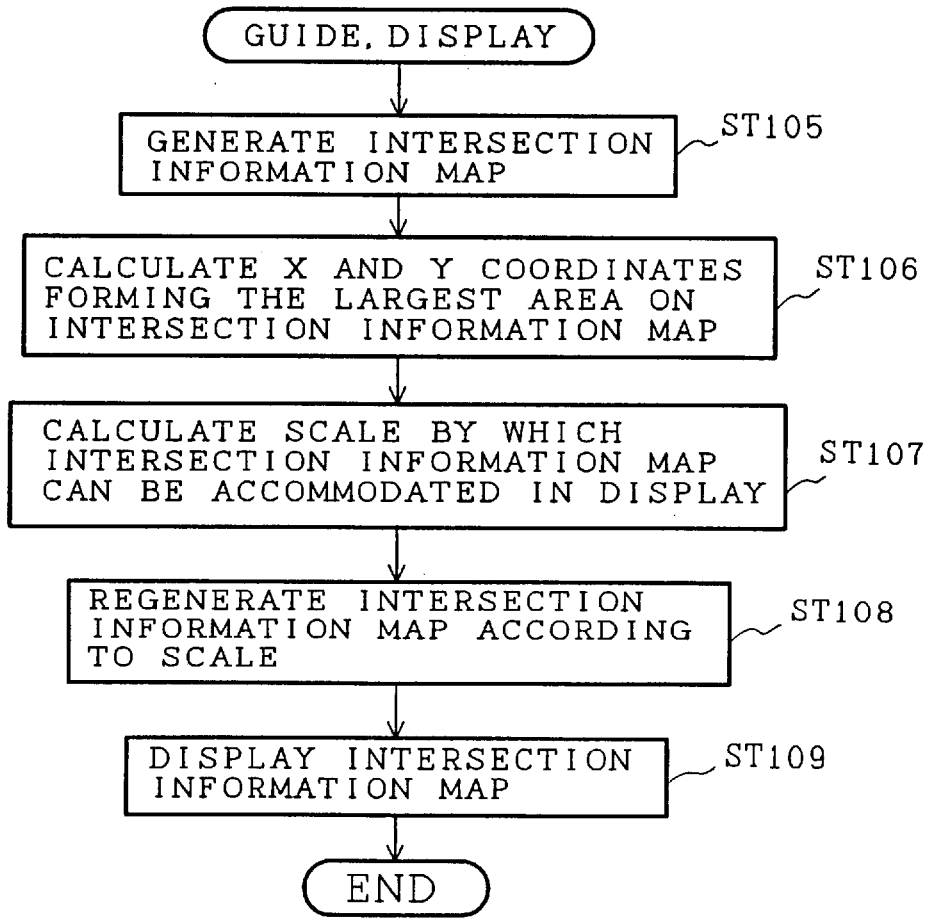
FIG. 59 is a flowchart showing an essential part of a flow of processing in the embodiment 17 of the present invention.

FIG. 59 is a flowchart of a flow of processing in a navigation apparatus according to the embodiment 17, showing only an essential part thereof. In the drawing, reference numerals ST105 to ST109 mean steps showing the units of processing.

Figure 60:
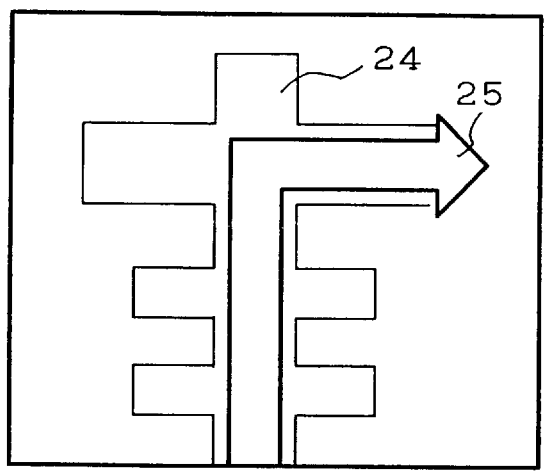
FIG. 60 is an explanatory view showing one illustrative intersection information map displayed in the embodiment 17 of the present invention.
Figure 61:
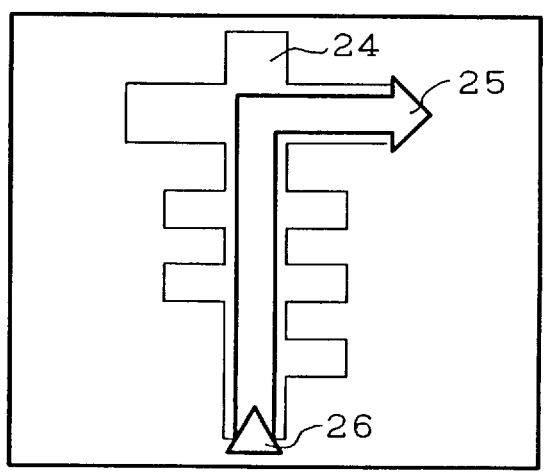
FIG. 61 is an explanatory view showing another illustrative intersection information map displayed in the embodiment 17 of the present invention.
Figure 62:
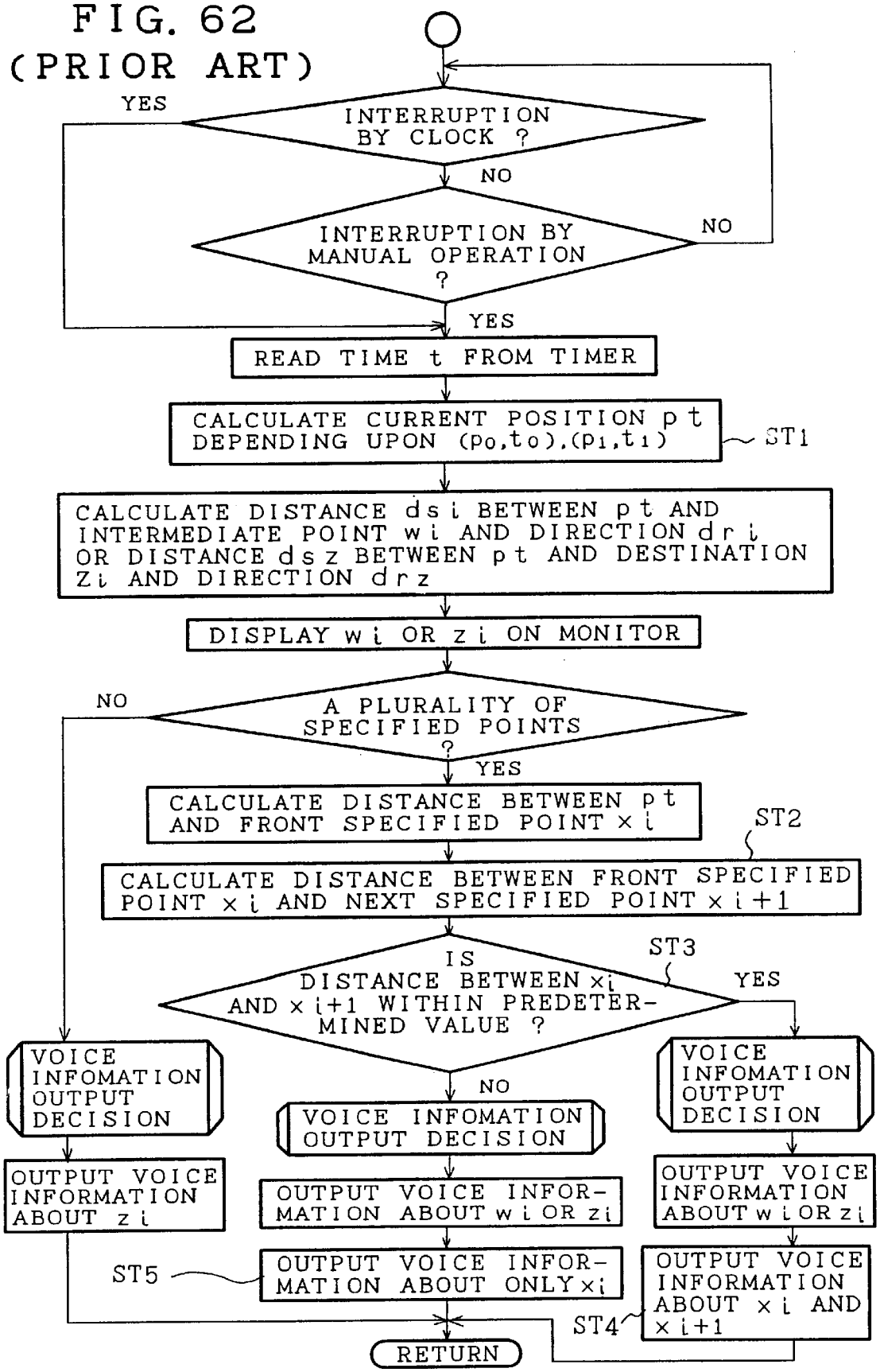
FIG. 62 is a flowchart showing a flow of processing in a conventional navigation apparatus.

FIGS. 60 and 61 are explanatory views showing illustrative intersection information maps displayed by the guide unit 55. FIG. 60 shows a state before the scale is changed by the control unit 90, and FIG. 61 shows a state after the scale is changed. In the drawings, reference numeral 24 means a shape of a road connected to the guide target intersection and intersections except the guide target intersection, 25 is a direction of travel from the guide target intersection, and 26 is a position of a mobile unit.

A description will now be given of the operation. The processing shown in the flowchart of FIG. 59 is equivalent to step ST64 in the processing in the embodiment 8 shown in the flowchart of FIG. 28. The control unit 90 generates an intersection information map in step ST105, and subsequently finds the x-coordinate and the y-coordinate forming the largest area from among the x-coordinates and the y-coordinates of a plurality of objects located on the intersection information map in step ST106. Next, in step ST107, the scale is set depending upon the x-coordinate and the y-coordinate forming the largest area such that the intersection information map can be accommodated in the display screen. The operation proceeds to step ST108 to regenerate the intersection information map according to the scale. Thereafter, in step ST109, the guide unit 55 displays the regenerated intersection information map.

As described above, even in case of the intersection information map which can not be accommodated in the display screen as shown in FIG. 60, it is possible to accommodate the intersection information map in the display screen as shown in FIG. 61 by changing the scale.

In the above discussion, the present invention is applied to the navigation apparatus according to the embodiment 8. However, it must be noted that the present invention may be applied to the navigation apparatus according to the embodiment 1. In this case, the guide unit 4 shown in FIG. 1 has the control unit 90, and the processing shown in the flowchart of FIG. 59 is equivalent to steps ST18 and ST20 shown in the flowchart of FIG. 5.

As set forth above, according to the embodiment 17, it is possible to adjust the scale of the intersection information map such that the entire intersection information map can be accommodated in the display screen when the plurality of intersections are displayed on the intersection information map. As a result, there is an effect in that it is possible to continuously provide the entire intersection information map for a driver.

As stated above, the following effects can be provided according to the present invention.

According to the preferred embodiment of the present invention, there is provided the navigation apparatus in which the guide unit extracts the guide target intersection on the path depending upon the map data stored in the map information storage unit and the path set in the path setting unit, and displays the guides about the two guide target intersections if the distance between the two adjacent guide target intersections is within the specified value. In case of the short distance between the guide target intersection in front of the mobile unit and the next guide target intersection, the guides about both the guide target intersections are concurrently displayed. As a result, there is an effect in that, in case of the short distance between the guide target intersections, the driver can previously grasp a situation about the next guide target intersection.

According to the preferred embodiment of the present invention, there is provided the navigation apparatus in which the guide unit detects the road attribute between the adjacent guide target intersections, and determines the specified value used to decide whether or not the guides about the two guide target intersections should concurrently be provided depending upon the road attribute. Thus, the distance between the guide target intersections to which the driver is concurrently guided is determined depending upon the road attribute therebetween. As a result, there is an effect in that the guide in closer touch with a sense of the driver can be provided.

According to the preferred embodiment of the present invention, there is provided the navigation apparatus in which the voice inform unit is disposed in the guide unit to select, depending upon the distance between the two adjacent guide target intersections, the voice message including the word showing the distance, and inform of the message through the voice. Through the voice, the driver is informed of the guide message changed according to the distance between the successive guide target intersections. As a result, there is an effect in that the driver can grasp the distance from the front guide target intersection to the next guide target intersection through the voice.

According to the preferred embodiment of the present invention, there is provided the navigation apparatus in which the voice inform unit is disposed in the guide unit to detect the road attribute between the two adjacent guide target intersections, and select the voice message including the word showing the road attribute so as to inform the driver of the message through the voice. Through the voice, the driver is informed of the guide message changed according to the road attribute between the guide target intersections. As a result, there is an effect in that the driver can grasp the road attribute between the successive guide target intersections through the voice.

According to the preferred embodiment of the present invention, there is provided the navigation apparatus in which the voice inform unit is disposed in the guide unit to detect the directions of travel at the two adjacent guide target intersections, and select the voice message on the basis of the combination of the directions of travel so as to inform the driver of the message through the voice. Through the voice, the driver is informed of the guide message changed according to the direction of travel at the guide target intersection. As a result, there is an effect in that the driver can grasp the relationship of the directions of travel at the guide target intersections through the voice.

According to the preferred embodiment of the present invention, there is provided the navigation apparatus in which the control unit is disposed in the guide unit, and when the guides about the plurality of guide target intersections are provided, the control unit decides whether or not the driver should be informed of the voice message about the guide target intersection on the destination side once again depending upon the result of comparison between the distance between the guide target intersections to which the driver is guided and the specified value. Hence, in case of the long distance from the point at which the driver is guided to the adjacent guide target intersections to the guide target intersection on the destination side, the driver can be informed of the voice message about the guide target intersection on the destination side once again after the mobile unit passes by the guide target intersection on the start point side. As a result, there is an effect in that it is possible to inform the driver of the message once again even when the driver starts to forget the message.

According to the preferred embodiment of the present invention, there is provided the navigation apparatus in which the control unit is disposed in the guide unit, and when the guides about the plurality of guide target intersections are provided, the control unit decides whether or not the driver should be informed of the voice message about the guide target intersection on the destination side once again depending upon the result of comparison between the time elapsed before the guide target intersection on the start point side is passed by after the guides and the specified value. Thus, when the predetermined time or more is elapsed before the guide target intersection on the start point side is passed by after the driver is guided to the adjacent guide target intersections, the driver can be informed of the voice message about the guide target intersection on the destination side once again after the mobile unit passes by the guide target intersection on the start point side. As a result, there is an effect in that it is possible to inform the driver of the message once again even when the driver starts to forget the message.

According to the preferred embodiment of the present invention, there is provided the navigation apparatus in which the guide unit extracts the guide target intersection located on the path depending upon the map data stored in the map information storage unit and the path set by the path setting unit, and detects the intersections except the guide target intersection, located between the guide target intersection and the current position of the mobile unit so as to display the intersections together with the guide target intersection. Hence, it is possible to display the intersections between the guide target intersection and the current position of the mobile unit on the intersection information map. As a result, there is an effect in that the driver can easily grasp the position of the guide target intersection depending upon the relationship between the guide target intersection and the intersections located between the guide target intersection and the current position of the mobile unit.

According to the preferred embodiment of the present invention, there is provided the navigation apparatus in which the detecting unit is disposed in the guide unit to detect the intersection except the guide target intersection located at the distance within the specified value from the guide target intersection on the path, and display the intersection together with the guide target intersection. Only the intersection in the vicinity of the guide target intersection can be displayed concurrently with the guide target intersection. As a result, there is an effect in that the driver can easily grasp the position of the guide target intersection depending upon the relationship between the guide target intersection and the intersection in the vicinity of the guide target intersection.

According to the preferred embodiment of the present invention, there is provided the navigation apparatus in which the detecting unit is disposed in the guide unit to detect the intersection of which the driver can be conscious on the path, and display the intersection together with the guide target intersection. Hence, it is possible to display only the intersection of which the driver can be conscious between the guide target intersection and the current position concurrently with the guide target intersection. As a result, there is an effect in that the driver can easily grasp the position of the guide target intersection depending upon the relationship between the guide target intersection and the intersection of which the driver can be conscious between the guide target intersection and the current position.

According to the preferred embodiment of the present invention, there is provided the navigation apparatus in which the detecting unit is disposed in the guide unit to detect the distinctive intersection on the path, and display the distinctive intersection together with the guide target intersection. Hence, it is possible to display only the distinctive intersection between the guide target intersection and the current position together with the guide target intersection. As a result, there is an effect in that the driver can easily grasp the position of the guide target intersection depending upon the relationship between the guide target intersection and the distinctive intersection between the guide target intersection and the current position.

According to the preferred embodiment of the present invention, there is provided the navigation apparatus in which the detecting unit is disposed in the guide unit to limit the number of detected distinctive intersections to the specified value or less. Hence, it is possible to limit the number of distinctive intersections between the guide target intersection and the current position, which are displayed concurrently with the guide target intersection, thereby eliminating the complication of the displayed intersection information map. As a result, there is an effect in that the driver can more easily grasp the position of the guide target intersection depending upon the relationship between the guide target intersection and the distinctive intersection between the guide target intersection and the current position.

According to the preferred embodiment of the present invention, there is provided the navigation apparatus in which the control unit is disposed in the guide unit to change the objects displayed on the intersection information map according to the number of displayed intersections. Hence, it is possible to prevent complicated display due to the excessive amount of information when the intersection information map are displayed. As a result, there are effects in that it is possible to provide the intersection information map which the driver can more easily read.

According to the preferred embodiment of the present invention, there is provided the navigation apparatus in which the control unit is disposed in the guide unit to limit the total number of displayed objects to the specified value when the plurality of guide target intersections are displayed or the single guide target intersection is displayed concurrently with the intersections except the guide target intersections. Hence, when the intersection information map is displayed, the amount of information can be kept constant. As a result, there is an effect in that it is possible to provide the intersection information map which the driver can more easily read.

According to the preferred embodiment of the present invention, there is provided the navigation apparatus in which the display unit is disposed in the guide unit to display the guide target intersection with the mark showing that it is the guide target intersection. Hence, when the intersection information map is displayed, the mark showing that it is the guide target intersection is displayed at the guide target intersection on the screen. As a result, there is an effect in that the driver can rapidly recognize the guide target intersection by the mark.

According to the preferred embodiment of the present invention, there is provided the navigation apparatus in which the control unit is disposed in the guide unit to adjust the display distance between the intersections such that the entire intersection information map can be accommodated in the display screen. Hence, when the intersection information map is displayed, the entire intersection information map can be accommodated in the display screen without a part lying offscreen. As a result, there is an effect in that the driver can continuously refer to the entire guide target intersection.

While preferred embodiments of the invention have been described using specific terms, such description is for illustrative purposes only, and it is to be understood that changes and variations may be made without departing from the spirit or scope of the following claims.

What is claimed is:

1. A navigation apparatus comprising:

map information storage means in which digitized map data such as road data and intersection data is stored;

path setting means for setting a path between two points on the map data stored in the map information storage means;

current position detecting means for detecting a current position of a mobile unit on the map data stored in the map information storage means; and guide means for extracting two adjacent guide target intersections about which a user should be informed of guide information from among intersections on the path depending upon the map data stored in the map information storage means and the path set in the path setting means, and detecting a distance between the two guide target intersections so as to inform of the guide information about the two guide target intersections and the relationship between said two adjacent guide target intersections and the relationship between said two adjacent guide target intersections when the distance is within a specified value, wherein the guide means has means for displaying the guide information about the two guide target intersections on a display unit; and wherein the guide means displays a guide information about a guide target intersection on the display unit when the guide target intersection is within a specified value from the current position of the mobile unit, and wherein when both a guide target intersection and a following guide target intersection are within the specified value from the current position of the mobile unit, the guide means displays the guide information for both the guide target intersections on the display unit simultaneously.

2. A navigation apparatus according to claim 1, wherein the guide means has means for informing of the guide information about the two guide target intersections through voice as a voice message.

3. A navigation apparatus according to claim 1, wherein the guide means has means for informing of a voice message corresponding to the guide information through voice concurrently with display of the guide information.

4. A navigation apparatus according to claim 1, wherein the guide means has means for detecting a road attribute between the two extracted adjacent guide target intersections, and determining the specified value depending upon the road attribute.

5. A navigation apparatus according to claim 1, wherein the guide means has means for selecting, depending upon a distance between the two extracted adjacent guide target intersections, a voice message including a word showing the distance, and informing of the voice message through voice.

6. A navigation apparatus according to claim 1, wherein the guide means has means for detecting a road attribute between the two extracted adjacent guide target intersections, and selecting a voice message including a word showing the road attribute so as to inform of the voice message through voice.

7. A navigation apparatus according to claim 1, wherein the guide means has means for detecting directions of travel of the mobile unit at the two extracted adjacent guide target intersections, and selecting a voice message used to inform depending upon a combination of the directions of travel so as to inform of the voice message through voice.

8. A navigation apparatus according to claim 1, wherein the guide means has means for, after guides about the two extracted adjacent guide target intersections are provided, deciding whether or not a distance between the guide target intersections is within a second specified value, and if the distance is equal to or more than the second specified value, informing of a voice message about the guide target intersection on the destination side once again after the mobile unit passes by the guide target intersection on the start point side.

9. A navigation apparatus according to claim 1, wherein the guide means has means for, after guides about the two extracted adjacent guide target intersections are provided, deciding whether or not a predetermined time is elapsed before the guide target intersection on the start point side is passed by, and if the predetermined time is elapsed, informing of a voice message about the guide target intersection on the destination side once again after the mobile unit passes by the guide target intersection on the start point side.

10. A navigation apparatus according to claim 1, wherein the guide means has means for selecting objects displayed on the intersection information map according to the number of intersections displayed on the intersection information map.

11. A navigation apparatus according to claim 10, wherein the guide means has means for limiting the total number of objects displayed on the intersection information map within a specified value.

12. A navigation apparatus according to claim 1, wherein the guide means has display means for putting a mark showing that it is the guide target intersection on the guide target intersection displayed on the intersection information map.

13. A navigation apparatus according to claim 1, wherein the guide unit has means for adjusting a display distance between the intersections displayed on the intersection information map such that the entire intersection information map can be accommodated in a display screen of the display unit.

14. A navigation apparatus comprising:

map information storage means in which digitized map data such as road data and intersection data is stored;

path setting means for setting a path between two points on the map data stored in the map information storage means;

current position detecting means for detecting a current position of a mobile unit on the map data stored in the map information storage means; and guide means for extracting a guide target intersection to be displayed on a display unit from among intersections on the path depending upon the map data stored in the map information storage means and the path set in the path setting means, detecting an intersection other than the guide target intersection located on the path between the guide target intersection and the current position of the mobile unit detected by the current position detecting means depending upon the extracted guide target intersection, the map data stored in the map information storage means, and the path set in the path setting means, and displaying the intersection together with the guide target intersection on the display unit as an intersection information map;

wherein the guide means has detecting means for detecting a distinctive intersection located on the path between the guide target intersection and the current position of the mobile unit, wherein the guide means also has means for displaying the guide information about the two guide target intersections on a display unit; and wherein the guide means displays a guide information about a guide target intersection on the display unit when the guide target intersection is within a specified value from the current position of the mobile unit, and wherein when both a guide target intersection and a following guide target intersection are within the specified value from the current position of the mobile unit, the guide means displays the guide information for both the guide target intersections on the display unit simultaneously.

15. A navigation apparatus according to claim 14, wherein the guide means has means for detecting only an intersection located at a distance within a specified value from the guide target intersection from among the intersections other than the guide target intersection located on the path between the guide target intersection and the current position of the mobile unit.

16. A navigation apparatus according to claim 14, wherein the guide means has means for detecting an intersection of which a driver can be conscious, located on the path between the guide target intersection and the current position of the mobile unit.

17. A navigation apparatus according to claim 14, wherein the guide means has means for selecting objects displayed on the intersection information map according to the number of intersections displayed on the intersection information map.

18. A navigation apparatus according to claim 17, wherein the guide means has means for limiting the total number of objects displayed on the intersection information map within a specific value.

19. A navigation apparatus according to claim 14, wherein the guide means has display means for putting a mark showing that it is the guide target intersection on the guide target intersection displayed on the intersection information map.

20. A navigation apparatus according to claim 14, wherein the guide unit has means for adjusting a display distance between the intersections displayed on the intersection information map such that the entire intersection information map can be accommodated in a display screen of the display unit.

21. A navigation apparatus according to claim 14, wherein, at a time of detecting the distinctive intersection located on the path between the guide target intersection and the current position of the mobile unit, the guide means limits the number of detected distinctive intersections within a specified value.

22. A navigation apparatus comprising:

map information storage means in which digitized map data such as road data and intersection data is stored;

path setting means for setting a path between two points on the map data stored in the map information storage means;

current position detecting means for detecting a current position of a mobile unit on the map data stored in the map information storage means; and guide means for extracting a guide target intersection to be displayed on a display unit from among intersections on the path depending upon the map data stored in the map information storage means and the path set in the path setting means, detecting an intersection other than the guide target intersection located on the path between the guide target intersection and the current position of the mobile unit detected by the current position detecting means depending upon the extracted guide target intersection, the map data stored in the map information storage means, and the path set in the path setting means, and displaying the intersection together with the guide target intersection on the display unit as an intersection information map;

wherein the guide means has detecting means for detecting a distinctive intersection located on the path between the guide target intersection and the current position of the mobile unit, and wherein, at a time of detecting the distinctive intersection located on the path between the guide target intersection and the current position of the mobile unit, the guide means limits the number of detected distinctive intersections within a specified value.

23. A navigation apparatus comprising:

map information storage means in which digitized map data such as road data and intersection data is stored;

path setting means for setting a path between two points on the map data stored in the map information storage means;

current position detecting means for detecting a current position of a mobile unit on the map data stored in the map information storage means; and guide means for extracting two adjacent guide target intersections about which a user should be informed of guide information from among intersections on the path depending upon the map data stored in the map information storage means and the path set in the path setting means, and detecting a distance between the two guide target intersections so as to inform of the guide information about the two guide target intersections and the relationship between said two adjacent guide target intersections and the relationship between said two adjacent guide target intersections when the distance is within a specified value, wherein the guide means has means for selecting objects displayed on the intersection information map according to the number of intersections displayed on the intersection information map; and wherein the guide means has means for limiting the total number of objects displayed on the intersection information map within a specified value.

24. A navigation apparatus comprising:

map information storage means in which digitized map data such as road data and intersection data is stored;

path setting means for setting a path between two points on the map data stored in the map information storage means;

current position detecting means for detecting a current position of a mobile unit on the map data stored in the map information storage means; and guide means for extracting a guide target intersection to be displayed on a display unit from among intersections on the path depending upon the map data stored in the map information storage means and the path set in the path setting means, detecting an intersection other than the guide target intersection located on the path between the guide target intersection and the current position of the mobile unit detected by the current position detecting means depending upon the extracted guide target intersection, the map data stored in the map information storage means, and the path set in the path setting means, and displaying the intersection together with the guide target intersection on the display unit as an intersection information map;

wherein the guide means has detecting means for detecting a distinctive intersection located on the path between the guide target intersection and the current position of the mobile unit, wherein the guide means also has means for selecting objects displayed on the intersection information map according to the number of intersections displayed on the intersection information map; and wherein the guide means has means for limiting the total number of objects displayed on the intersection information map within a specified value.

* * * * *